(12) United States Patent
Kodama et al.

(10) Patent No.: US 10,843,858 B2
(45) Date of Patent: Nov. 24, 2020

(54) SHEET MATERIAL CONTAINER

(71) Applicant: Kao Corporation, Tokyo (JP)

(72) Inventors: Daisuke Kodama, Tokyo (JP); Yoshinori Inagawa, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 16/645,812

(22) PCT Filed: Jul. 12, 2018

(86) PCT No.: PCT/JP2018/026345
§ 371 (c)(1),
(2) Date: Mar. 10, 2020

(87) PCT Pub. No.: WO2020/012606
PCT Pub. Date: Jan. 16, 2020

(65) Prior Publication Data
US 2020/0277118 A1 Sep. 3, 2020

(51) Int. Cl.
*B65D 75/32* (2006.01)
*B65D 75/58* (2006.01)
(Continued)

(52) U.S. Cl.
CPC ........... *B65D 75/322* (2013.01); *B65D 65/40* (2013.01); *B65D 75/008* (2013.01); *B65D 75/5883* (2013.01)

(58) Field of Classification Search
USPC .............................. 206/459.5, 457; 215/12.1
See application file for complete search history.

(56) References Cited

U.S. PATENT DOCUMENTS 5,916,646 A * 6/1999 Baudin .................. B29C 49/24
                                                                215/12.1
9,090,372 B2 * 7/2015 Warner .................. B65D 41/06
(Continued)

FOREIGN PATENT DOCUMENTS

EP       3 593 984 A1    1/2020
JP      2015-520706 A    7/2015
(Continued)

OTHER PUBLICATIONS

International Search Report dated Oct. 9, 2018 in PCT/JP2018/026345 filed Jul. 12, 2018, 1 page.
(Continued)

*Primary Examiner* — Jacob K Ackun
(74) *Attorney, Agent, or Firm* — Oblon, McClelland, Maier & Neustadt, L.L.P.

(57) ABSTRACT

A sheet material container (C) includes a containing portion (10a) that contains contents (96) and is formed of a layer sheet (120). The layer sheet (120) includes an inner sheet (123), an intermediate sheet (122) covering an outer side of the inner sheet (123), and an outer sheet (121) covering an outer side of the intermediate sheet (122), and is arranged on opposite sides with the containing portion (10a) between the opposite sides. At least parts of the outer sheet (121) and the intermediate sheet (122) include light transmitting portions (34a, 34b, 34c) that can transmit visible light. The inner sheet (123) or the contents (96) can be visually recognized through the light transmitting portions (34a, 34b, 34c) from outside the sheet material container (C).

20 Claims, 19 Drawing Sheets

(51) Int. Cl.
  *B65D 75/00*   (2006.01)
  *B65D 65/40*   (2006.01)

(56) References Cited

U.S. PATENT DOCUMENTS

| | | | |
|---|---|---|---|
| 2006/0027478 A1 | 2/2006 | Kaufman et al. | |
| 2008/0257847 A1* | 10/2008 | Van Hove | B29C 49/06 |
| | | | 215/12.1 |
| 2009/0320338 A1* | 12/2009 | David | G09F 23/00 |
| | | | 40/310 |
| 2012/0074091 A1* | 3/2012 | Himelstein | B65D 15/02 |
| | | | 215/12.2 |
| 2013/0292287 A1 | 11/2013 | Stanley et al. | |
| 2014/0033654 A1 | 2/2014 | Stanley et al. | |
| 2014/0291273 A1* | 10/2014 | Warner | B65D 13/04 |
| | | | 215/12.2 |
| 2015/0248849 A1* | 9/2015 | Lorence | B65C 9/26 |
| | | | 206/459.5 |
| 2019/0168941 A1 | 6/2019 | Otsuka et al. | |
| 2019/0185213 A1 | 6/2019 | Kodama et al. | |
| 2019/0248546 A1 | 8/2019 | Inagawa et al. | |
| 2019/0276212 A1* | 9/2019 | Speck | B65B 49/02 |

FOREIGN PATENT DOCUMENTS

| | | |
|---|---|---|
| JP | 2015-524778 A | 8/2015 |
| JP | 2015-527269 A | 9/2015 |
| JP | 2017-14063 A | 8/2017 |
| JP | 6186547 B1 | 8/2017 |
| JP | 6193535 B1 | 9/2017 |
| JP | 2018-108842 A | 7/2018 |
| JP | 2018-108843 A | 7/2018 |
| JP | 2018-144363 A | 9/2018 |
| JP | 2018-144856 A | 9/2018 |
| JP | 2018-144857 A | 9/2018 |
| JP | 2018-144860 A | 9/2018 |
| JP | 2018-144885 A | 9/2018 |
| JP | 2018-144886 A | 9/2018 |
| JP | 2018-144888 A | 9/2018 |
| JP | 6510152 B1 | 5/2019 |
| JP | 2019-214398 A | 12/2019 |
| JP | 2019-218072 A | 12/2019 |
| WO | WO 2014/025609 A1 | 2/2014 |
| WO | WO 2018/164117 A1 | 9/2018 |

OTHER PUBLICATIONS

Written Opinion dated Oct. 9, 2018, in PCT/JP2018/026345 (with English Translation).
Extended European Search Report dated Jun. 17, 2020, in European Patent Application No. 18926130.8.

* cited by examiner

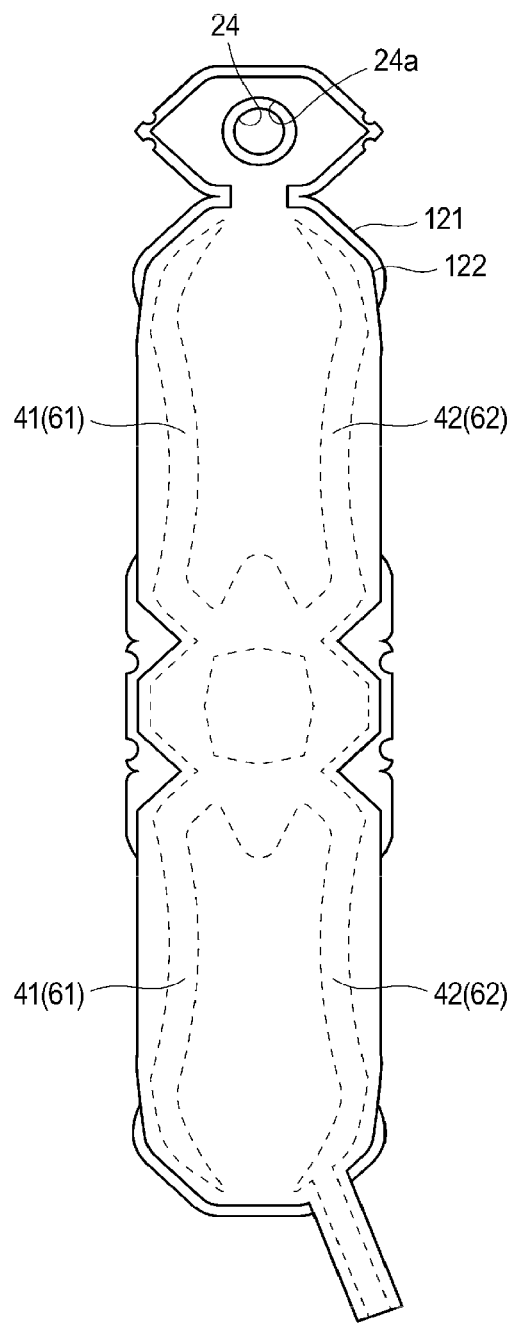

ND_SHEET MATERIAL CONTAINER

TECHNICAL FIELD

The present invention relates to a sheet material container and a sheet material container filled with contents.

BACKGROUND ART

In recent years, soft packaging containers formed of sheet materials have been proposed in which an non-attached region is partially provided between layers of the sheet materials and encloses a filler such as air to form a filled portion to the non-attached region in order to improve shape retention or the like (for example, Patent Document 1).

CITATION LIST

Patent Document 1: International Publication No. WO 2014/025609

SUMMARY OF THE INVENTION

The present invention relates to a sheet material container including a containing portion that contains contents and formed of a layer sheet, wherein the layer sheet includes an inner sheet, an intermediate sheet covering an outer side of the inner sheet, and an outer sheet covering an outer side of the intermediate sheet, and is arranged on opposite sides with the containing portion between the opposite sides, at least parts of peripheral edges of the inner sheet are attached so that the inner sheet forms an inner bag, the outer sheet and the intermediate sheet have attached portions partially attached to each other and non-attached regions not attached to each other, a filled portion enclosing a filler is formed between the outer sheet and the intermediate sheet in the non-attached region, at least parts of the outer sheet and the intermediate sheet include light transmitting portions that can transmit visible light, the light transmitting portions in the outer sheet and the intermediate sheet have overlapping portions when seen from outside the sheet material container, and the inner sheet or the contents can be visually recognized through the light transmitting portions from outside the sheet material container.

BRIEF DESCRIPTION OF THE DRAWINGS

FIG. 3 is a sectional view of the sheet material container containing contents taken along a line III-III in FIG. 1.

FIG. 5 is a plan view of an expanded state of filled portions formed by attaching a part of the outer sheet and a part of the intermediate sheet.

DESCRIPTION OF EMBODIMENTS

Figure 1:
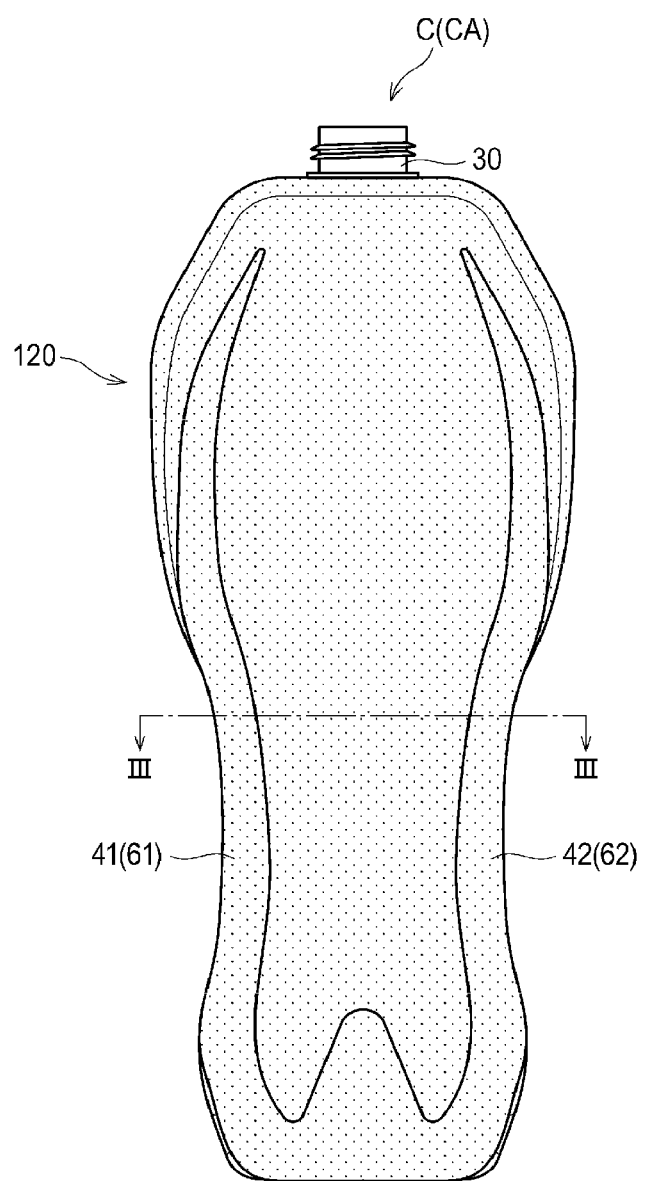
FIG. 1 is a front view of a sheet material container according to a first embodiment.

In a container including a filled portion as described in Patent Document 1, contents tend to remain in an area adjacent to the filled portion, that is, a recess (step) at a boundary between a filler enclosed portion and other portions. To prevent the contents from remaining in the recess at the boundary between the filler enclosed portion and the other portions, an inner bag that contains the contents may be provided inside a cover including the filled portion.

The present invention relates to a sheet material container that includes a filled portion enclosing a filler and allows an inner sheet that forms an inner bag or contents to be visually recognized from outside the sheet material container, and a sheet material container filled with contents. According to the present invention, the filled portion can increase rigidity, and also provide, to the sheet material container, a three-dimensional appearance that cannot be expressed by a general film decoration for decorating only an outer surface of the sheet material container.

Now, preferred embodiments of the present invention will be described with reference to the drawings.

The embodiments descried below are mere examples for easy understanding of the present invention and do not limit the present invention. Specifically, shapes, dimensions, arrangements, or the like of members described below may be changed or improved without departing from the gist of the present invention, and the present invention includes equivalents thereof.

In all the drawings, like components are denoted by like reference numerals and overlapping descriptions will not be repeated as appropriate.

<<Outline>>

First, with reference to FIGS. 1 to 3, an outline of a sheet material container C (sheet material container filled with contents CA) according to this embodiment will be described.

Figure 2:
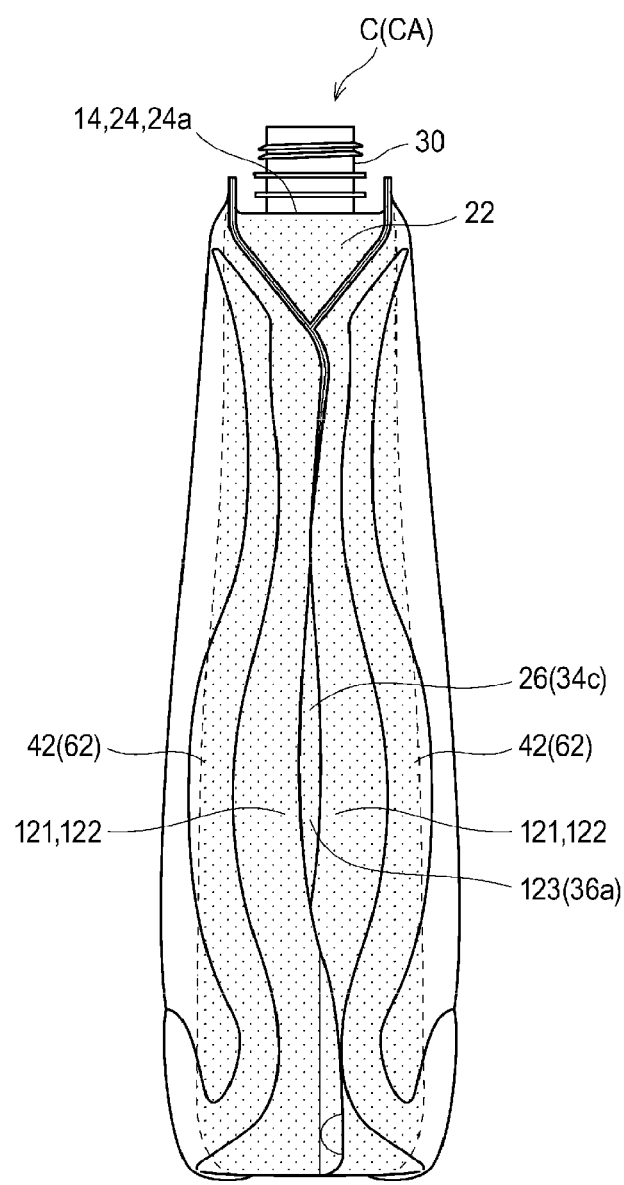
FIG. 2 is a side view of the sheet material container according to the first embodiment.
Figure 3A:
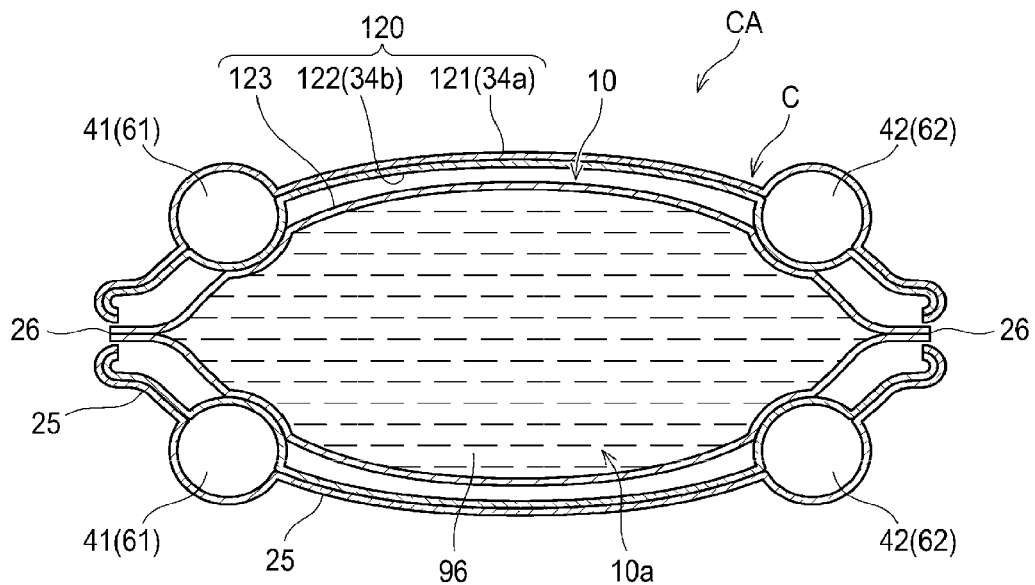
FIG. 3A shows a state of a containing portion filled with the contents.
Figure 3B:
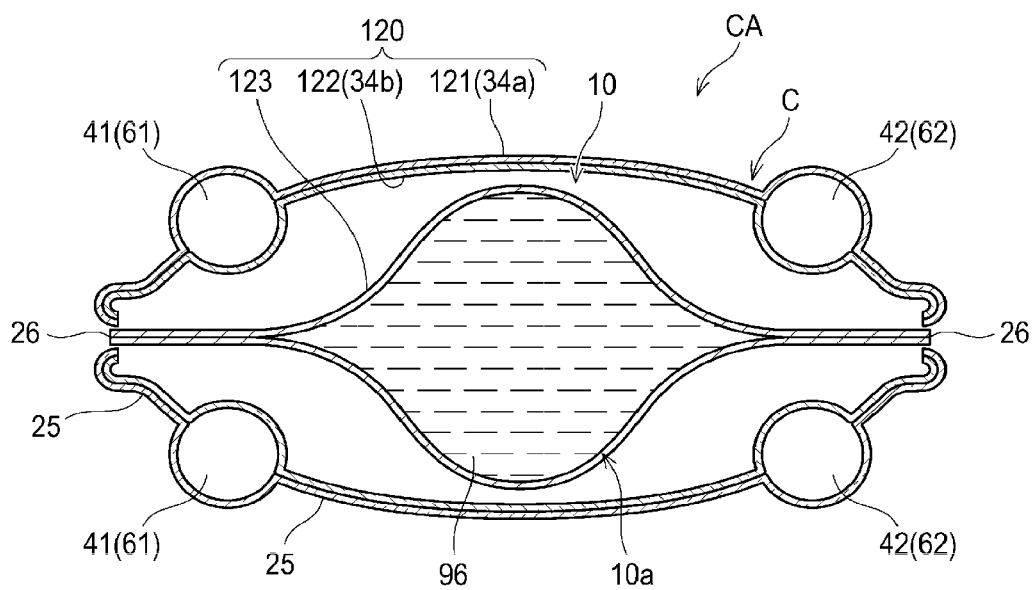
FIG. 3B shows the contents decreasing from the state in FIG. 3A.

FIG. 1 is a front view of a sheet material container C according to a first embodiment, and FIG. 2 is a side view thereof. FIG. 3 is a sectional view of the sheet material container C containing contents 96 (sheet material container filled with contents CA) taken along a line III-III in FIG. 1, FIG. 3A shows a state of a containing portion 10a filled with the contents 96, and FIG. 3B shows the contents 96 decreasing from the state in FIG. 3A.

As shown in FIG. 3, the sheet material container C according to this embodiment includes the containing portion 10a that contains the contents 96, and is formed of a layer sheet 120.

The layer sheet 120 includes an inner sheet 123, an intermediate sheet 122 covering an outer side of the inner sheet 123, and an outer sheet 121 covering an outer side of the intermediate sheet 122, and is arranged on opposite sides with the containing portion 10a between the opposite sides.

At least parts of peripheral edges of the inner sheet 123 are attached so that the inner sheet 123 forms an inner bag 10. The outer sheet 121 and the intermediate sheet 122 have attached portions 25 partially attached to each other and non-attached regions 61, 62 not attached to each other. The attached portions 25 are attached, for example, by a heat seal.

Filled portions 41, 42 enclosing a filler are formed between the outer sheet 121 and the intermediate sheet 122 in the non-attached regions 61, 62. At least parts of the outer sheet 121 and the intermediate sheet 122 include light transmitting portions 34a, 34b shown in FIG. 3 and a light transmitting portion 34c shown in FIG. 2 which can transmit visible light.

The outer sheet 121 includes the light transmitting portion 34a, and the intermediate sheet 122 includes the light transmitting portion 34b. The light transmitting portions 34a, 34b in the outer sheet 121 and the intermediate sheet 122 have portions overlapping each other when seen from outside the sheet material container C. Here, the "light transmitting portion" includes a portion like an opening 26 described later with reference to FIG. 2 which has light transmittance because of including no member in a space. A portion without a member (light transmitting portion) in the outer sheet 121 and a portion without a member (light transmitting portion) in the intermediate sheet 122 have portions overlapping each other to form the opening 26. In this embodiment, the portion without a member in the outer sheet 121 and the portion without a member in the intermediate sheet 122 are collectively referred to as the light transmitting portion 34c.

The light transmitting portions 34a, 34b in the outer sheet 121 and the intermediate sheet 122 need only have portions overlapping each other when seen from outside the sheet material container C, and there is no need for the light transmitting portion 34a and the light transmitting portion 34b to entirely overlap each other.

The inner sheet 123 or the contents 96 can be visually recognized through the light transmitting portions 34a, 34b, 34c from outside the sheet material container C.

As shown in FIGS. 3A and 3B, the sheet material container filled with contents CA includes the sheet material container C and the contents 96 held in the containing portion 10a.

The "opposite sides with the containing portion 10a between the opposite sides" described above refer to opposite sides with at least a part of the containing portion 10a between the opposite sides. For example, if the containing portion has a pentagonal section, the opposite sides include any one side and either or both of two sides facing the one side. The containing portion 10a may be held in any directions such as vertical, lateral, or obliquely vertical directions besides a front-back direction like the sheet material container C.

The inner sheet 123, the intermediate sheet 122, and the outer sheet 121 each may further include laminated layers.

As the inner sheet 123 that forms the inner bag 10, one inner sheet 123 is folded and parts of peripheral edges thereof are attached as described later. However, parts of peripheral edges of a plurality of inner sheets may be attached without being folded to form an inner bag 10.

The "filled portions 41, 42" are not limited to those formed in all the non-attached regions 61, 62, but may be formed in a part of a plurality of non-attached regions.

"Filler" may be a fluid (gas or liquid), a solid (for example, granules, resin pellets, or the like), or a semisolid (for example, foamed material or the like), and is preferably a gas such as air.

The "light transmitting portions 34a, 34b, 34c" include a transparent or translucent material having light transmittance (light transmitting portions 34a, 34b), and also portions like the opening 26 (FIGS. 2, 3A, and 3B) provided in the outer sheet 121 and the intermediate sheet 122, which have light transmittance because of including no member in a space (light transmitting portion 34c). The light transmitting portion may be formed in the entire intermediate sheet 122 and outer sheet 121.

The light transmitting portions 34a, 34b, 34c according to this embodiment are arranged in the sheets in positions where the visible light from outside the sheet material container C can be linearly transmitted to at least a part of the inner sheet 123. "Light transmittance" herein refers to transmittance of light based on thicknesses or materials, and particularly refers to a function of transmitting visible light (400 nm to 700 nm) A portion that "can transmit visible light" may be a portion having higher visible light transmittance than other areas in the sheet material container C. The visible light transmittance is preferably 5% or higher, more preferably 10% or higher, and preferably 100% or lower. The visible light transmittance can be measured with reference to JIS K7375: 2008.

For the fact that the light transmitting portions 34a, 34b have portions overlapping each other when seen from outside the sheet material container C, specifically, the light transmitting portions 34a, 34b have overlapping portions on at least one side of the opposite sides of the sheet material container C with the containing portion 10a between the opposite sides.

Specifically, no member without light transmittance (light shielding member) is provided between at least parts of the light transmitting portions 34a, 34b. On the other hand, a member including at least an area with light transmittance may be provided between the light transmitting portions 34a, 34b. With such a configuration, the visible light can be transmitted through the light transmitting portions 34a, 34b in the outer sheet 121 and the intermediate sheet 122 to the inner sheet 123 without being shielded by the light shielding member.

One that "can be visually recognized" herein refers to something of which presence can be recognized by a human, not limited to clearly recognized.

The contents 96 can be visually recognized through the inner sheet 123 from outside the sheet material container C when the inner sheet 123 has the light transmittance that can transmit visible light (in other words, the inner sheet 123 has the light transmitting portion).

For the sheet material container formed of the layer sheet that is a soft packaging material, an outer container may be deformed as the sheet that forms an inner container is deformed.

On the other hand, the sheet material container C according to this embodiment includes the filled portions 41, 42 between the outer sheet 121 and the intermediate sheet 122 that form the outer container, and thus has increased rigidity and can stably maintain its shape to some extent.

According to the above described configuration, the inner sheet 123 or the contents 96 can be visually recognized from outside the sheet material container C, and thus a three-dimensional appearance can be provided to the sheet material container C, which cannot be expressed by a general film decoration for decorating only an outer surface of the sheet material container C.

First Embodiment

Figure 4C:
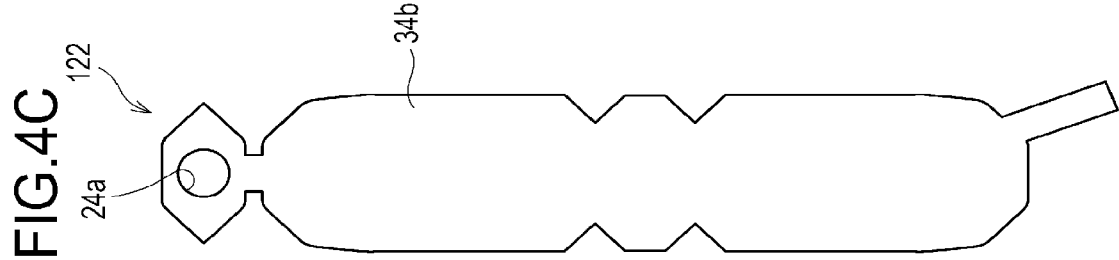
FIG. 4C is a plan view of an expanded state of an intermediate sheet.
Figure 4B:
FIG. 4B is a plan view of an expanded state of an outer sheet.
Figure 4A:
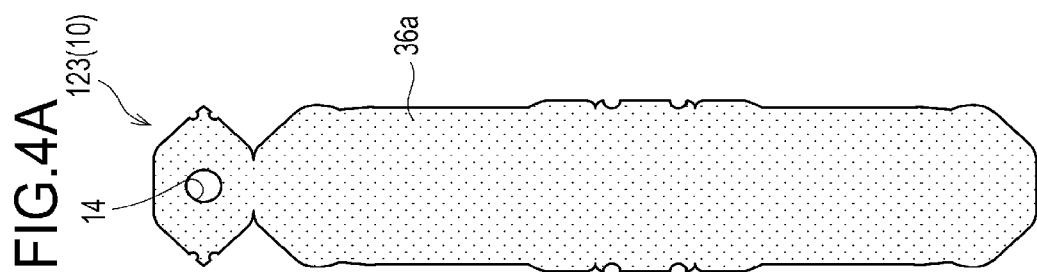
FIG. 4A is a plan view of an expanded state of an inner sheet that forms an inner bag of the sheet material container.

Next, mainly with reference to FIGS. 4 and 5 in addition to FIGS. 1 to 3, details of a sheet material container C according to a first embodiment of the present invention will be described. FIG. 4A is a plan view of an expanded state of an inner sheet 123 that forms an inner bag 10 of the sheet material container C, FIG. 4B is a plan view of an expanded state of an outer sheet 121, and FIG. 4C is a plan view of an expanded state of an intermediate sheet 122. FIG. 5 is a plan view of an expanded state of filled portions 41, 42 formed by attaching a part of the outer sheet 121 and a part of the intermediate sheet 122.

As described above with reference to FIG. 3, the sheet material container C according to this embodiment includes a containing portion 10a that contains contents 96, and is formed of a layer sheet 120.

The layer sheet 120 includes the inner sheet 123, the intermediate sheet 122 covering an outer side of the inner sheet 123, and the outer sheet 121 covering an outer side of the intermediate sheet 12.

In this embodiment, the layer sheet 120 is folded substantially at a middle part, and parts of peripheral edges thereof are attached to form the sheet material container C.

A ceiling 22 is provided at one end of the folded layer sheet 120. The ceiling 22 has an opening 14 through which the contents 96 in the containing portion 10a can be discharged to the outside. A spout 30 for discharging the contents 96 in the containing portion 10a to the outside is mounted to the ceiling 22. The spout 30 is provided through the opening 14 in the inner sheet 123, an opening 24a in the intermediate sheet 122, and an opening 24 in the outer sheet 121.

As shown in the side view in FIG. 2, in the sheet material container C, peripheral edges of the outer sheet 121 and the intermediate sheet 122 attached and folded to face each other are not attached but separated at a vertically middle part, thereby forming an opening 26 that is a gap between the peripheral edges. The opening 26 serves as a light transmitting portion 34c as described above, and exposes the inner sheet 123 (decorative portion 36a) therein so that the inner sheet 123 can be visually recognized from outside the sheet material container C.

A vertical relationship herein is described for a positional relationship with the sheet material container C standing on its own as in FIG. 1, unless otherwise specified. Specifically, with the sheet material container C being placed on a horizontal surface, a bottom is a lower side and the opposite is an upper side.

The sheet material container C includes filled portions 41, 42 formed by non-attached regions 61, 62 between the outer sheet 121 and the intermediate sheet 122 being filled with a filler and expanded in a thickness direction. The filled portions 41, 42 vertically extend along edge portions of the intermediate sheet 122.

As shown in FIGS. 3A and 3B, a part of the inner sheet 123 can be separated from the intermediate sheet 122, and a volume of the inner bag 10 can increase or decrease according to an amount of contents 96 held. The inner sheet 123 according to this embodiment is configured to be separable from parts other than a part of the ceiling 22 of the intermediate sheet 122.

As such, the part of the inner sheet 123 is configured to be separable from the intermediate sheet 122, thereby allowing the contents 96 in the inner bag 10 to be easily discharged, and preventing the contents 96 from remaining in the inner bag 10. Also, a user can visually recognize a degree of expansion of the inner bag 10 through the light transmitting portions 34a, 34b, 34c from outside the sheet material container C. Thus, the user can check the amount of contents 96 held from the degree of expansion of the inner bag 10.

Further, according to a decrease in an internal volume of the inner bag 10, the inner sheet 123 loosens so as to wrinkle, thereby creating a space between the inner sheet 123 and the intermediate sheet 122. Thus, the inner bag 10 formed of the inner sheet 123 is formed into a complex three-dimensional shape, which is shown in an appearance of the sheet material container C, thereby providing a characteristic good appearance to the sheet material container C.

As shown in FIG. 4A, the decorative portion 36a with decoration is provided on the inner sheet 123. The decorative portion 36a on the inner sheet 123 is located in positions overlapping the light transmitting portions 34a, 34b, 34c in the outer sheet 121 and the intermediate sheet 122 when seen from outside the sheet material container C, and in positions where visible light is transmitted through the light transmitting portions 34a, 34b, 34c from outside the sheet material container C.

Specifically, no member without light transmittance is provided between the decorative portion 36a and the light transmitting portion 34b and between the light transmitting portion 34a and the light transmitting portion 34b. Also, no member without light transmittance is provided between the decorative portion 36a and the light transmitting portion 34c and between areas that form the light transmitting portion 34c in the outer sheet 121 and the intermediate sheet 122.

On the other hand, a member including at least an area with light transmittance may be provided between the decorative portion 36a and areas that form the light transmitting portions 34a, 34b or the light transmitting portion 34c between the inner sheet 123 and the intermediate sheet 122 or between the intermediate sheet 122 and the outer sheet 121.

With such a configuration, the visible light can be transmitted through the light transmitting portions 34a, 34b, 34c in the outer sheet 121 and the intermediate sheet 122 to the decorative portion 36*a* on the inner sheet 123.

In the sheet material container C according to this embodiment, the entire inner sheet 123 has a chromatic color. Specifically, the decorative portion 36*a* decorated with the chromatic color is formed on the entire inner sheet 123.

The present invention is not limited to such a configuration, but the chromatic color may be applied to only an outer surface of the inner sheet 123, or the chromatic color, an achromatic color, or patterns may be applied to only a part of the inner sheet 123. The decorative portion may or may not have light transmittance.

The "decorative portion" herein includes patterns, colors, letters, or symbols, which are formed by any printing such as offset, gravure, flexographic, or screen printing, or formed by attaching a printed shrink film.

The outer sheet 121 and the intermediate sheet 122 according to this embodiment entirely have light transmittance. Specifically, the light transmitting portion 34*a* is formed in the entire outer sheet 121, and the light transmitting portion 34*b* is formed in the entire intermediate sheet 122. As such, the light transmitting portions 34*a*, 34*b* are formed in the entire outer sheet 121 and intermediate sheet 122, thereby increasing an exposed region of the inner bag 10 (inner sheet 123) that changes in shape according to the internal volume to improve appearance.

Also, the present invention is not limited to such a configuration, but only parts of the outer sheet 121 and the intermediate sheet 122 may include the light transmitting portions 34*a*, 34*b*, or only parts of the light transmitting portions 34*a*, 34*b* may overlap each other when seen from outside the sheet material container C. Only the light transmitting portion 34*c* that is the opening 26 may be provided. The light transmitting portions 34*a*, 34*b*, 34*c* need only be formed in at least parts of the outer sheet 121 and the intermediate sheet 122 in positions where the decorative portion 36*a* can be visually recognized from outside the sheet material container C.

With such a configuration, a user can visually recognize the decorative portion 36*a* provided on the inner sheet 123 through the light transmitting portions 34*a*, 34*b*, 34*c*, thereby providing a good appearance to the sheet material container C.

Second Embodiment

Next, with reference to FIGS. 6 to 9, a sheet material container C1 (sheet material container filled with contents CA1) according to a second embodiment will be described.

Figure 6:
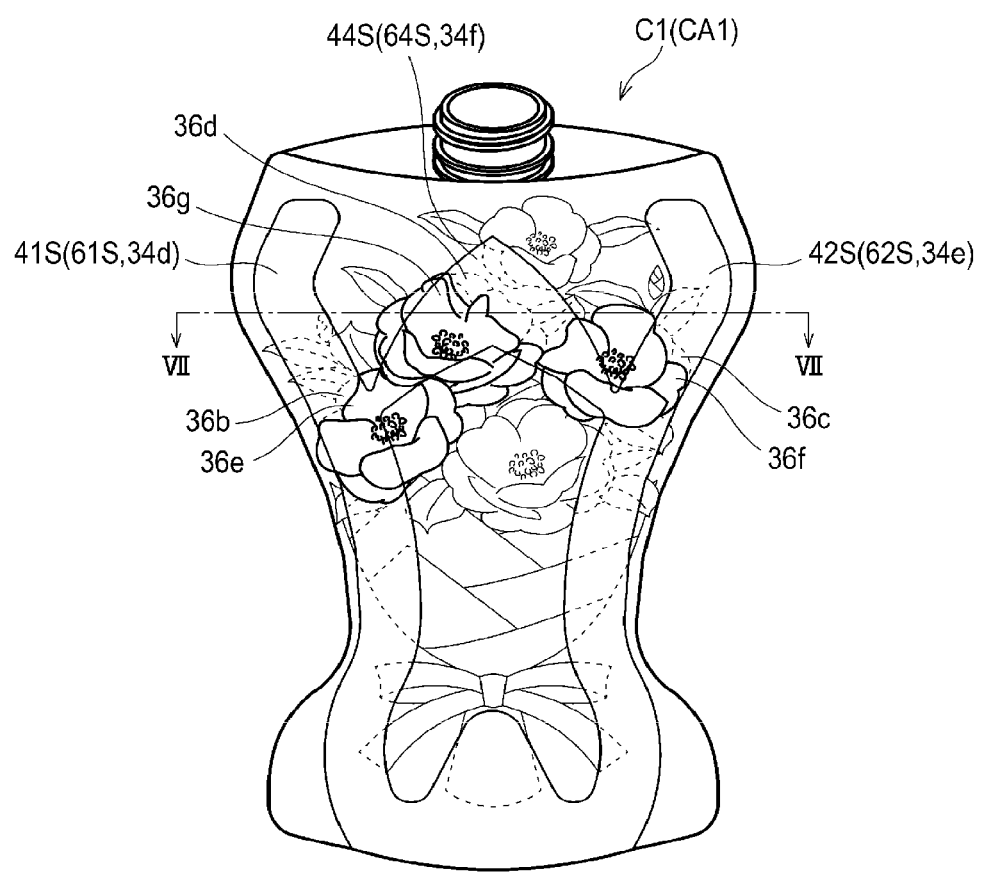
FIG. 6 is a top perspective view of a sheet material container (sheet material container filled with contents) according to a second embodiment.
Figure 7:
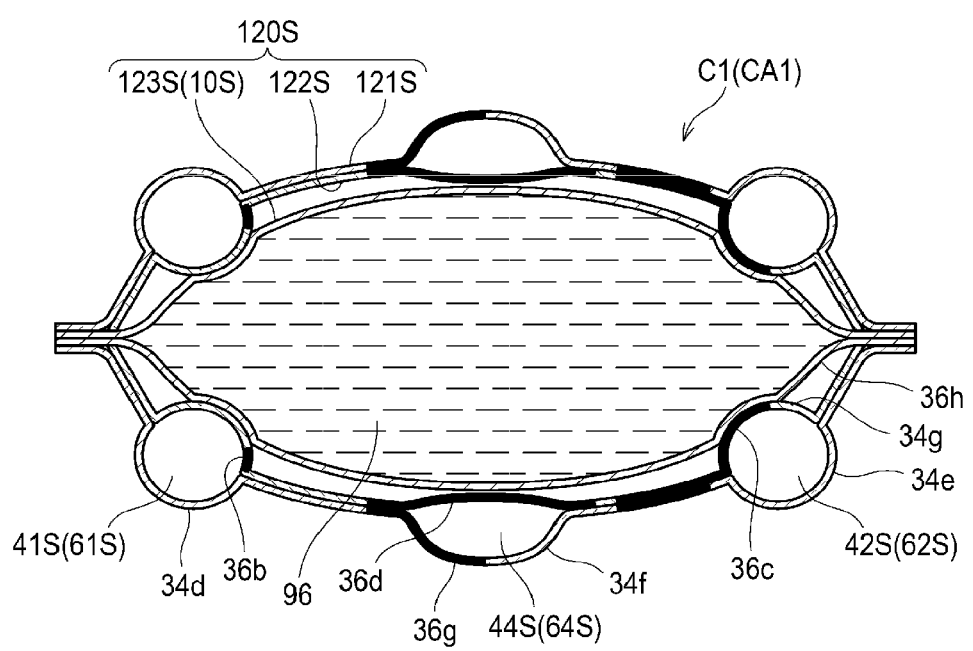
FIG. 7 is a sectional view of the sheet material container filled with contents taken along a line VII-VII in FIG. 6.
Figure 8C:
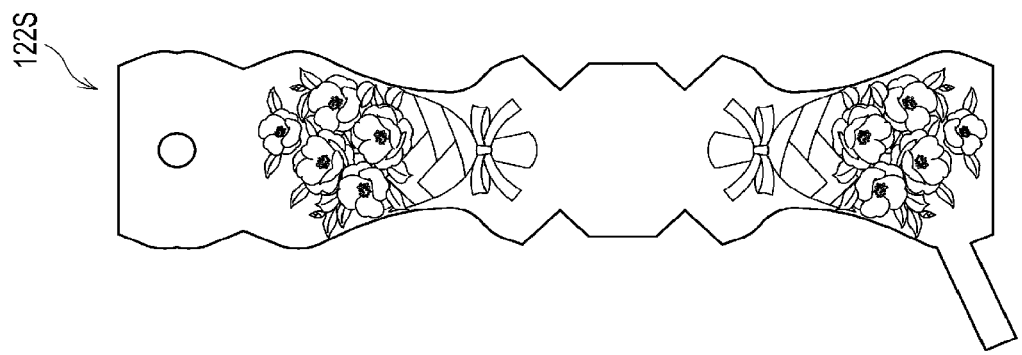
FIG. 8C is a plan view (outer side) of an expanded state of an intermediate sheet.
Figure 8B:
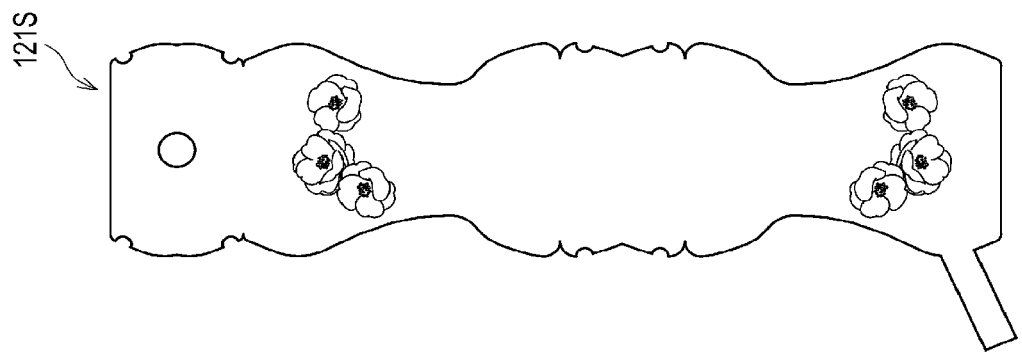
FIG. 8B is a plan view (outer side) of an expanded state of an outer sheet.
Figure 8A:
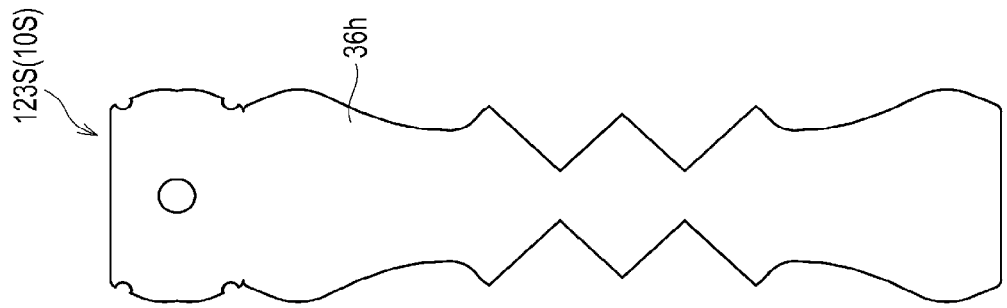
FIG. 8A is a plan view of an expanded state of an inner sheet that forms an inner bag of the sheet material container.
Figure 9:
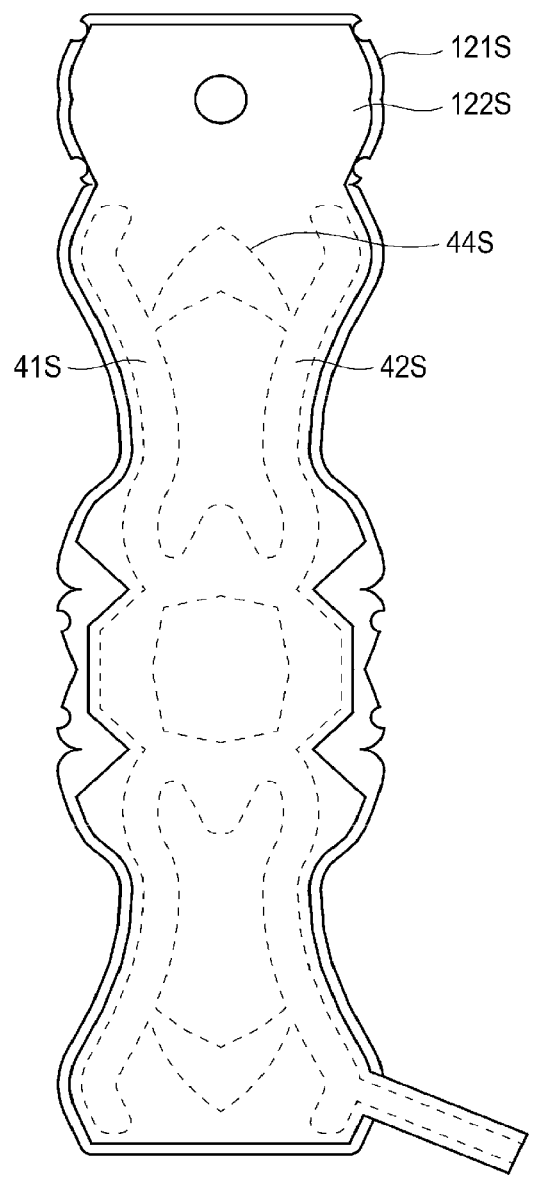
FIG. 9 is a plan view (inner side) of an expanded state of filled portions formed by attaching a part of the outer sheet and a part of the intermediate sheet.

FIG. 6 is a top perspective view of the sheet material container C1 (sheet material container filled with contents CA1) according to the second embodiment, and FIG. 7 is a sectional view of the sheet material container filled with contents CA1 taken along a line VII-VII in FIG. 6. FIG. 8A is a plan view of an expanded state of an inner sheet 123S that forms an inner bag 10S of the sheet material container C1, FIG. 8B is a plan view (outer side) of an expanded state of an outer sheet 121S, and FIG. 8C is a plan view (outer side) of an expanded state of an intermediate sheet 122S. FIG. 9 is a plan view (inner side) of an expanded state of filled portions 41S, 42S, 44S formed by attaching a part of the outer sheet 121S and a part of the intermediate sheet 122S.

In FIG. 6, for convenience of description, decorative portions are shown by different types of lines. Specifically, outer decorative portions 36*e*, 36*f*, 36*g* on the outer sheet 121S described later are shown by heavy lines. Intermediate decorative portions 36*b*, 36*c*, 36*d* on the intermediate sheet 122S in close contact with the outer sheet 121S are shown by narrow lines, and intermediate decorative portions 36*b*, 36*c*, 36*d* located inside an outer surface in areas with the filled portions 41S, 42S, 44S are shown by dashed lines.

The sheet material container C1 according to the second embodiment is a container including the filled portions 41S, 42S, 44S and a bouquet-like three-dimensional decoration.

As shown in FIGS. 6 to 9, the sheet material container C1 according to this embodiment is formed of a layer sheet 120S including the inner sheet 123S, the intermediate sheet 122S covering an outer side of the inner sheet 123S, and the outer sheet 121S covering an outer side of the intermediate sheet 122S.

The filled portions 41S, 42S, 44S enclosing a filler are partially formed between the outer sheet 121S and the intermediate sheet 122S.

In the sheet material container C1 according to the second embodiment, light transmitting portions 34*d*, 34*e*, 34*f* are provided in non-attached regions 61S, 62S, 64S forming the filled portions 41S, 42S, 44S in the outer sheet 121S. Also, in the sheet material container C1 according to the second embodiment, the outer decorative portions 36*e*, 36*f*, 36*g* with decoration are provided on the outer sheet 121S. The outer decorative portions 36*e*, 36*f*, 36*g* are formed on at least the non-attached regions 61S, 62S, 64S.

The intermediate decorative portions 36*b*, 36*c*, 36*d* with decorations are provided on at least a part of the intermediate sheet 122S.

The intermediate decorative portions 36*b*, 36*c*, 36*d* are formed in positions overlapping the light transmitting portions 34*d*, 34*e*, 34*f* provided in the outer sheet 121S when seen from outside the sheet material container C1, and in positions where visible light is transmitted through the light transmitting portions 34*d*, 34*e*, 34*f* from outside the sheet material container C1.

In the sheet material container C1 according to the above described configuration, the light transmitting portions 34*d*, 34*e*, 34*f* are located in areas with the filled portion 41S, 42S, 44S, and the intermediate decorative portions 36*b*, 36*c*, 36*d* provided on the intermediate sheet 122S are located in positions overlapping the light transmitting portions 34*d*, 34*e*, 34*f*.

Specifically, no member without light transmittance is provided between areas with the intermediate decorative portions 36*b*, 36*c*, 36*d* on the intermediate sheet 122S and areas with the light transmitting portions 34*d*, 34*e*, 34*f* in the outer sheet 121S. On the other hand, a member including at least an area with light transmittance may be provided between the intermediate decorative portions 36*b*, 36*c*, 36*d* and the light transmitting portions 34*d*, 34*e*, 34*f* between the intermediate sheet 122S and the outer sheet 121S.

With such a configuration, the visible light can be transmitted through the light transmitting portions 34*d*, 34*e*, 34*f* in the outer sheet 121 to the intermediate decorative portions 36*b*, 36*c*, 36*d* on the intermediate sheet 122S. "The visible light being transmitted" herein refers to the visible light being transmitted as a physical phenomenon, and the visible light includes light that cannot be visually recognized by a human.

With such a configuration, gaps corresponding to an amount of the filler (such as air) are created between the outer sheet 121S forming outer surfaces of the filled portions 41S, 42S, 44S and the intermediate decorative portions 36*b*, 36*c*, 36*d*. Thus, together with the outer decorative portions 36*e*, 36*f*, 36*g* provided on the outer sheet 121S with light transmittance, the intermediate decorative portions 36*b*, 36*c*, 36d provided on the intermediate sheet 122S can provide a three-dimensional decorative expression.

The light transmitting portions 34e, 34g are provided in the non-attached regions 61S, 62S, 64S forming the filled portions 41S, 42S, 44S in the outer sheet 121S and the intermediate sheet 122S. A decorative portion 36h with decoration is provided on at least a part of the inner sheet 123S (inner bag 10S).

In the sheet material container C1 according to this embodiment, the entire inner sheet 123S has a chromatic color. Specifically, the decorative portion 36h decorated with the chromatic color is formed on the entire inner sheet 123S. The light transmitting portions 34e, 34g in the outer sheet 121S and the intermediate sheet 122S have portions overlapping each other when seen from outside the sheet material container C1. The decorative portion 36h is formed in a position overlapping the light transmitting portion 34e in the outer sheet 121S and the light transmitting portion 34g in the intermediate sheet 122S when seen from outside the sheet material container C1, and is provided in a position where the visible light is transmitted through the light transmitting portions 34e, 34g from outside the sheet material container C1.

No member without light transmittance is provided between an area with the decorative portion 36h on the inner sheet 123S and an area with the light transmitting portion 34g in the intermediate sheet 122S, and between the light transmitting portion 34g and the light transmitting portion 34e. On the other hand, a member including at least an area with light transmittance may be provided between the decorative portion 36h and the light transmitting portion 34g and between the light transmitting portion 34g and the light transmitting portion 34e between the inner sheet 123S and the intermediate sheet 122S or between the intermediate sheet 122S and the outer sheet 121S.

With such a configuration, the visible light can be transmitted through the light transmitting portion 34e in the outer sheet 121 and the light transmitting portion 34g in the intermediate sheet 122S to the decorative portion 36h on the inner sheet 123S.

The present invention is not limited to such a configuration, but the chromatic color may be applied to only an outer surface of the inner sheet 123S, or the chromatic color, an achromatic color, or patterns may be applied to only a part of the inner sheet 123S. The decorative portion may or may not have light transmittance.

In the outer sheet 121S according to this embodiment, the outer decorative portions 36e, 36f, 36g with decoration are provided in the non-attached regions 61S, 62S, 64S forming the filled portions 41S, 42S, 44S.

Thus, the filled portions 41S, 44S are filled with the filler and expanded in a thickness direction to provide an uneven shape to a surface of the outer sheet 121S so that the outer decorative portions 36e, 36f, 36g include areas with the uneven shape, thereby allowing a more three-dimensional expression of the outer decorative portions 36e, 36f, 36g and improving a decorative effect.

Further, the outer decorative portions 36e, 36f, 36g can be combined with the intermediate decorative portions 36b, 36c, 36d provided on the intermediate sheet 122S to provide three-dimensional decorative effects on different decorative surfaces.

The outer decorative portions 36e, 36f, 36g may be shifted from the intermediate decorative portions 36b, 36c, 36d provided on the intermediate sheet 122S, or may overlap the intermediate decorative portions 36b, 36c, 36d as long as the outer decorative portions 36e, 36f, 36g have light transmittance. The outer decorative portions 36e, 36f, 36g without light transmittance may entirely overlap the intermediate decorative portions 36b, 36c, 36d in a certain direction. Even in this case, the intermediate decorative portions 36b, 36c, 36d provided on the intermediate sheet 122S need only be visually recognizable in a different direction from the light transmitting portions 34d, 34e, 34f provided in the outer sheet 121S in areas other than the outer decorative portions 36e, 36f, 36g.

In particular, decorative expressions can be made at different depth positions in the sheet material container C1, thereby allowing wider variation of decoration. For example, the decorative portion 36h on the inner sheet 123S may show an environment in water, the intermediate decorative portion on the intermediate sheet 122S may show an environment on the ground, and the outer decorative portion on the outer sheet 121S may show an environment in air.

Specifically, the decorative portion 36h, the intermediate decorative portions 36b, 36c, 36d, and the outer decorative portions 36e, 36f, 36g may provide different decorative expressions according to a positional relationship among the inner sheet 123S, the intermediate sheet 122S, and the outer sheet 121S. This can provide a decorative effect of a three-dimensional space with unity to the sheet material container C1.

Third Embodiment

Next, with reference to FIGS. 10 to 12, a sheet material container C2 (sheet material container filled with contents CA2) according to a third embodiment will be described.

Figure 10:
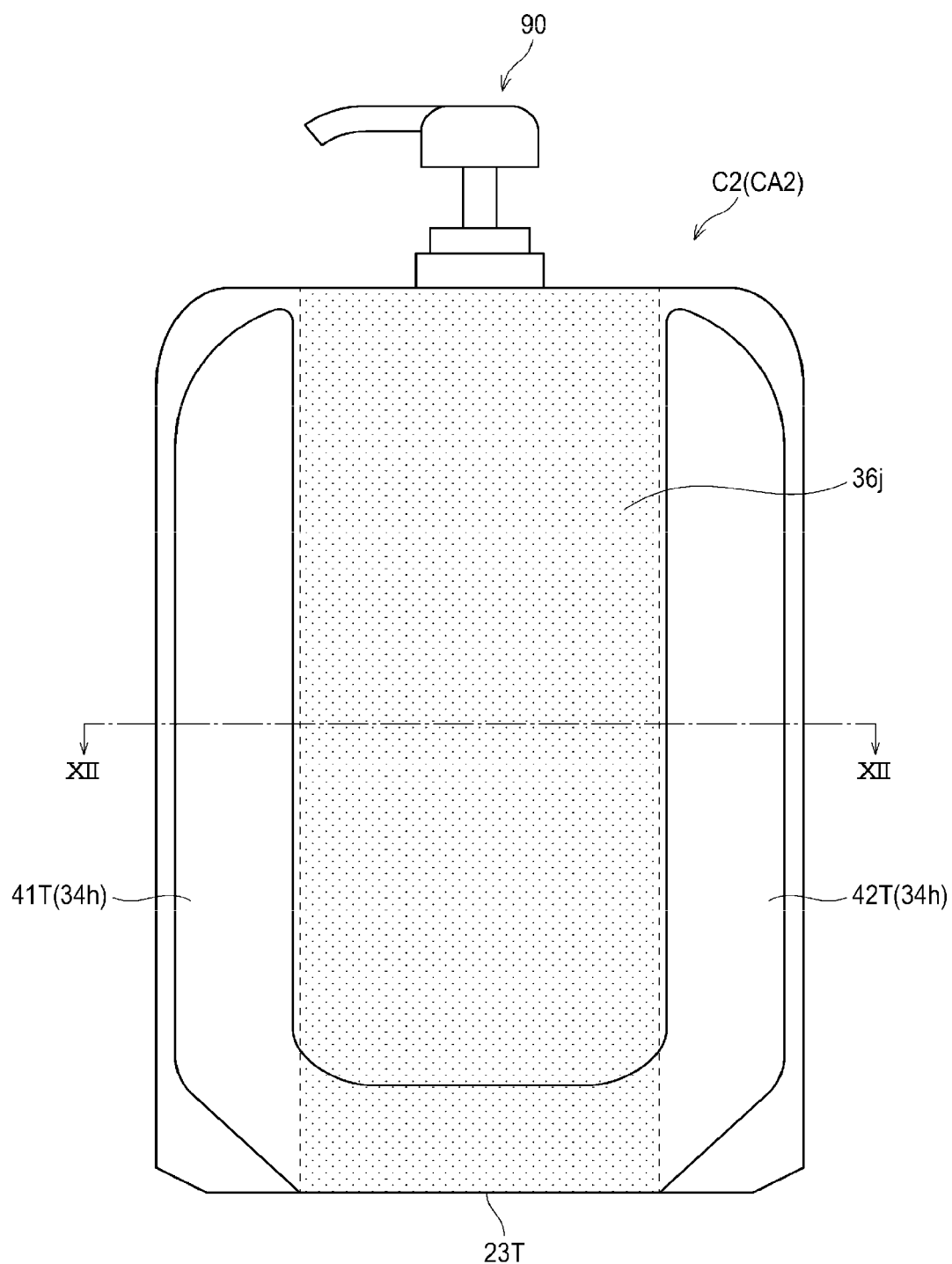
FIG. 10 is a front view of a sheet material container (sheet material container filled with contents) according to a third embodiment.
Figure 11:
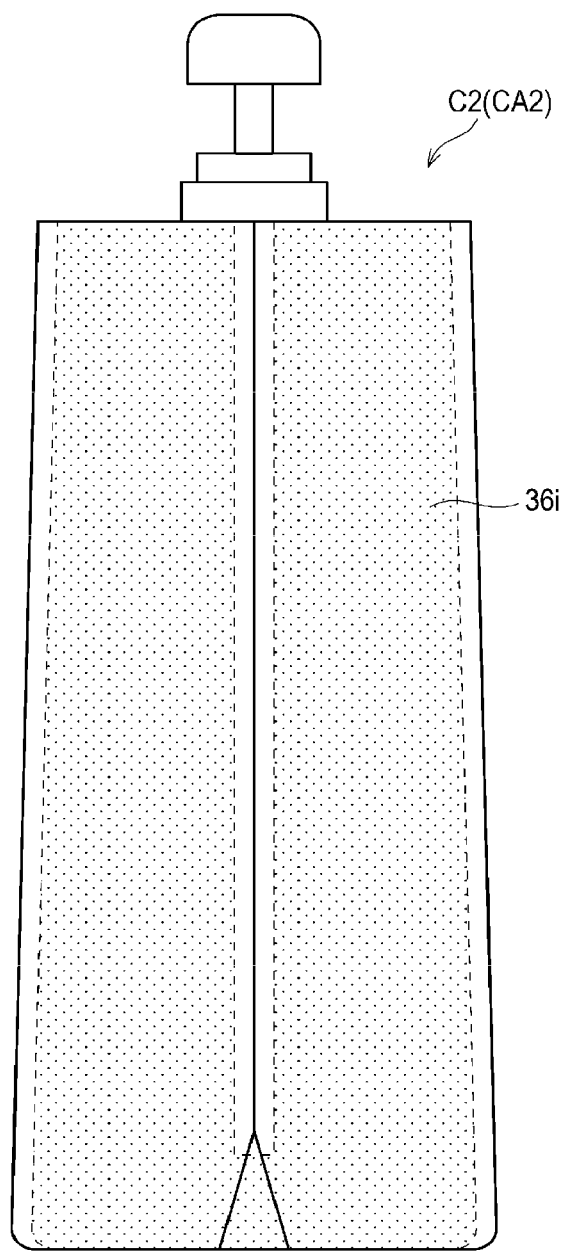
FIG. 11 is a side view of the sheet material container (sheet material container filled with contents) according to the third embodiment.

FIG. 10 is a front view of a sheet material container C2 (sheet material container filled with contents CA2) according to a third embodiment, and FIG. 11 is a side view thereof. FIG. 12 is a sectional view of the sheet material container filled with contents CA2 taken along a line XII-XII in FIG. 10.

The sheet material container C2 according to this embodiment is a container configured so that an inner bag 10T decorated like a vase can be visually recognized from outside the sheet material container C2.

Figure 12:
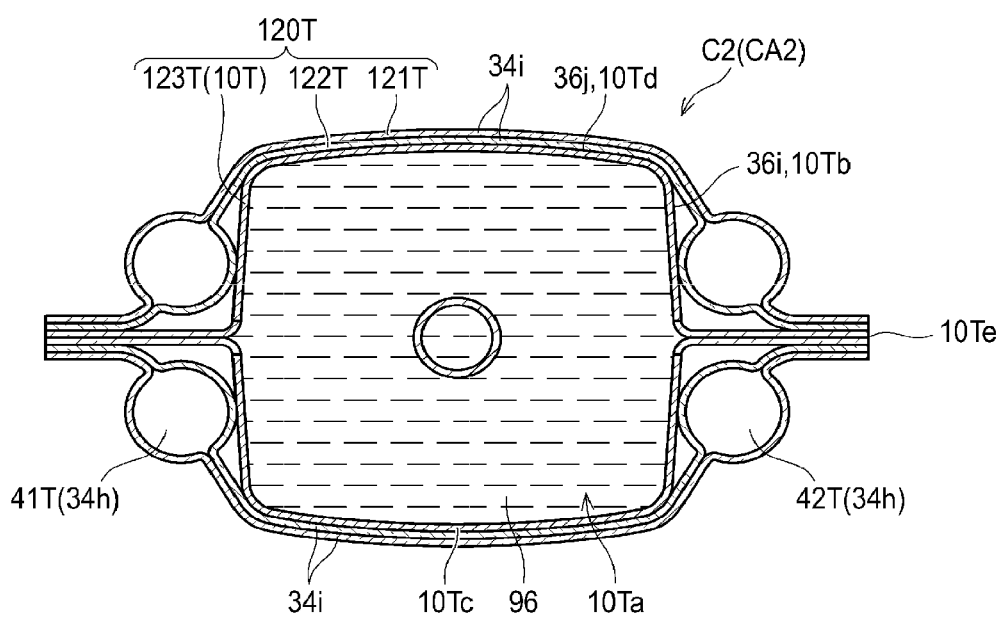
FIG. 12 is a sectional view of the sheet material container filled with contents taken along a line XII-XII in FIG. 10.

As shown in FIG. 12, the sheet material container C2 according to this embodiment includes an inner bag 10T (containing portion 10Ta) that contains contents 96, is formed of a layer sheet 120T, and includes a take-out portion (cap with pump 90) in FIG. 10 which is connected to the inner bag 10T and can discharge the contents 96 to the outside.

The layer sheet 120T includes an inner sheet 123T, an intermediate sheet 122T covering an outer side of the inner sheet 123T, and an outer sheet 121T covering an outer side of the intermediate sheet 122T. Filled portions 41T, 42T enclosing a filler are partially formed between the outer sheet 121T and the intermediate sheet 122T.

In this embodiment, the layer sheet 120T is folded substantially at a middle part, and parts of peripheral edges thereof are attached to form the sheet material container C2. Specifically, the intermediate sheet 122T and the outer sheet 121T are provided over the take-out portion (cap with pump 90) and a bottom 23T of the sheet material container C2.

The outer sheet 121T and the intermediate sheet 122T in this embodiment entirely have light transmittance, and will be described particularly with the filled portions 41T, 42T being light transmitting portions 34h and back and front portions being light transmitting portions 34i as shown in FIG. 12.

The filled portions 41T, 42T of the sheet material container C2 according to this embodiment are arranged on opposite side sections in a lateral direction of the sheet material container C2, and decorative portions 36*i*, 36*j* with decoration are provided on at least a part of the inner sheet 123T. The decorative portions 36*i*, 36*j* are formed in three-dimensional shapes between the opposite side sections in the lateral direction of the inner sheet 123T.

The "three-dimensional shape" includes polyhedral shapes or shapes with curves extending in X, Y, and Z directions except planar two-dimensional shapes. The "three-dimensional shapes" of the decorative portions 36*i*, 36*j* are preferably formed with an aspect ratio different from that of an outer shape of the sheet material container C2 in a planar view.

If the filled portions 41T, 42T are filled with a liquid or a gas as the filler, internal pressure from the filler tends to curve outer surfaces of the filled portions 41T, 42T. Thus, when the filled portions 41T, 42T are arranged on the opposite side sections of the sheet material container C2, the sheet material container C2 has a rounded outer shape.

Then, the outer sheet 121T and the intermediate sheet 122T including the filled portions 41T, 42T have light transmittance so that the decorative portions 36*i*, 36*j* on the inner sheet 123T can be visually recognized as a three-dimensional shape (an angular vase shape in this embodiment). Specifically the light transmitting portions 34*h*, 34*i* formed in the outer sheet 121T and the intermediate sheet 122T overlap each other when seen from outside the sheet material container C2, and the decorative portions 36*i*, 36*j* on the inner sheet 123T can be visually recognized through the light transmitting portions 34*h*, 34*i*. With such a configuration, a special good appearance that cannot be expressed by only an appearance of the outer sheet 121T can be provided to the sheet material container C2.

As such, it is preferable that the inner bag 10T is designed so as to have a shape of a special article such as a vase, and that the design is emphasized. For example, if at least areas forming the filled portions 41T, 42T in the outer sheet 121T and the intermediate sheet 122T are designed to be transparent, high designability can be provided to the sheet material container C2.

In this embodiment, the filled portions 41T, 42T are described to be provided on the opposite side sections in the lateral direction of the sheet material container C2. Such a configuration is preferable in terms of high shape stability of the sheet material container C2, but the present invention is not limited to the configuration.

For example, the filled portions 41T, 42T may be provided on opposite sides in any directions such as a vertical direction or a depth direction. Specifically, the "opposite sides" in the present invention refer to opposite sides in any directions. Further, for example, the filled portions 41T, 42T may be provided on at least one of opposite sides in any directions like a pillow-shaped container.

As shown in FIG. 10, the filled portions 41T, 42T are provided to stand from the bottom 23T on the opposite side sections in a direction perpendicular to a direction connecting the take-out portion (cap with pump 90) and the bottom 23T.

The "take-out portion" may be the cap with pump 90 or only a spout.

The "direction connecting the take-out portion and the bottom" is the vertical direction in this embodiment, but not limited to a linear direction connecting the spout or the cap with pump 90 corresponding to the take-out portion and the bottom 23T, defines a direction with a certain range. For example, this term refers to a direction connecting an upper side and a bottom side even if the spout or the cap with pump 90 is mounted to an upper side surface.

The filled portions 41T, 42T may be provided in any positions on the opposite side sections in the direction perpendicular to the direction connecting the take-out portion (cap with pump 90) and the bottom 23T, and are particularly preferably provided near outermost edges, more preferably at the outermost edges on the opposite side sections. Such a configuration improves stability of an orientation of the sheet material container C2.

As shown in FIG. 12, the inner sheet 123T includes facing surfaces (surfaces along depth 10Tb) located on the opposite side sections of the sheet material container C2 and facing the filled portions 41T, 42T between the containing portion 10Ta and the filled portions 41T, 42T, and crossing surfaces (front surface 10Tc and back surface 10Td) located between the facing surfaces (surfaces along depth 10Tb) on the opposite side sections of the sheet material container C2 and crossing the facing surfaces (surfaces along depth 10Tb).

The decorative portions 36*i*, 36*j* according to this embodiment include the decorative portion 36*i* provided on the surfaces along depth 10Tb and the decorative portion 36*j* provided on the crossing surfaces (front surface 10Tc and back surface 10Td), and are continuously provided on the facing surfaces (surfaces along depth 10Tb) and the crossing surfaces. The decorative portion 36*i* is preferably provided on at least the facing surfaces (surfaces along depth 10Tb).

According to the above described configuration, even if the filled portions 41T, 42T provide a rounded appearance, the filled portions 41T, 42T having the light transmitting portions 34*h* allow an appearance with a depth of the decorative portion 36*i* different from appearances of the filled portions 41T, 42T to be visually recognized through the light transmitting portions 34*h*.

In particular, the rounded filled portions 41T, 42T including the light transmitting portions 34*h* are provided on the outer side in the lateral direction of the sheet material container C2 than the decorative portion 36*i* provided on the surface along depth 10Tb and the decorative portion 36*j* provided on the back surface 10Td. This allows angular appearances of the decorative portions 36*i*, 36*j* of a polyhedral shape on the inner bag 10T in the sheet material container C2, which are different from the appearances of the rounded filled portions 41T, 42T, to be visually recognized through the light transmitting portions 34*h*, thereby improving designability. Further, the decorative portion 36*i* and the decorative portion 36*j* are continuously provided on the front surface and the back surface of the sheet material container C2. With such a configuration, the decorative portions 36*i*, 36*j* provide an appearance expression of one article such as a vase.

Opposite side sections of the inner sheet 123T are held between the intermediate sheets 122T arranged on the opposite sides with the containing portion 10Ta between the opposite sides. The inner sheet 123T includes held portions (side ends 10Te) on the opposite side sections, and a middle portion (surfaces along depth 10Tb, front surface 10Tc, back surface 10Td) in a middle section that is not held between the intermediate sheets 122T. The decorative portions 36*i*, 36*j* are provided on the middle portion (surfaces along depth 10Tb, front surface 10Tc, back surface 10Td). In the held portions (side ends 10Te), the inner sheet 123T may or may not be attached to the intermediate sheets 122T.

For example, no decorative portion is provided on the side ends 10Te of the inner sheet 123T according to this embodiment, but the decorative portions 36*i*, 36*j* are provided on the surfaces along depth 10Tb, the front surface 10Tc, and the back surface 10Td. Specifically, the decorative portions 36i, 36j are provided only on areas of the inner sheet 123T which form the containing portion 10Ta, and no decorative portion is provided on the side ends 10Te of the inner sheet 123T extending from the containing portion 10Ta to the opposite sides. With such a configuration, the surfaces along depth 10Tb extending on the opposite sides in the depth direction can be seen like being continuous in the depth direction.

However, the present invention is not limited to such a configuration, but the decorative portions 36i, 36j need only be provided on at least the middle portion (surfaces along depth 10Tb, front surface 10Tc, back surface 10Td) to provide a visual effect of a continuous shape in the depth direction. For example, decorative portions may be provided on the held portions (side ends 10Te). In this case, the decorative portion 36i is preferably a different decoration separate from the decorative portions provided on the held portions because the decorative portion 36i can be expressed like being continuous on the front surface and the back surface of the sheet material container C2.

Fourth Embodiment

Next, with reference to FIGS. 13 to 15, a sheet material container C3 according to a fourth embodiment will be described.

Figure 13:
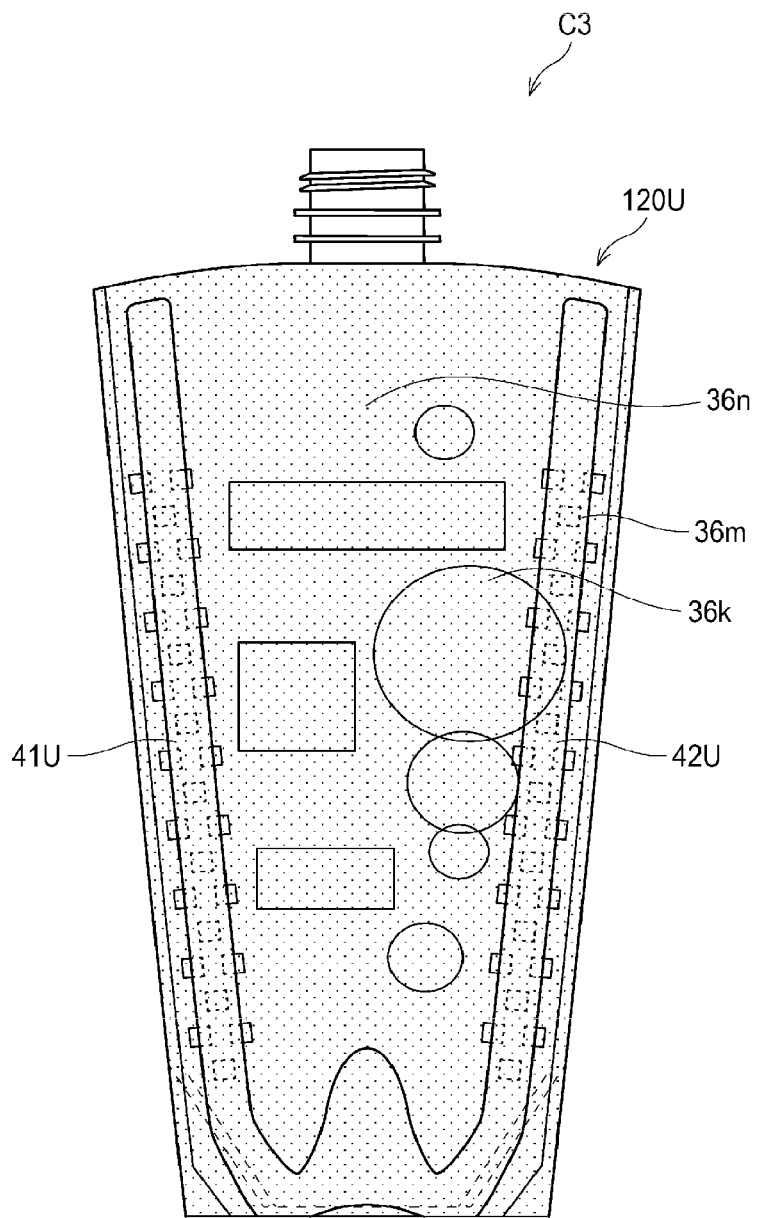
FIG. 13 is a front view of a sheet material container according to a fourth embodiment.

FIG. 13 is a front view of the sheet material container C3 according to a fourth embodiment. FIG. 14A is a plan view of an expanded state of an inner sheet 123U that forms an inner bag 10U of the sheet material container C3, FIG. 14B is a plan view (outer side) of an expanded state of an outer sheet 121U, and FIG. 14C is a plan view (outer side) of an expanded state of an intermediate sheet 122U. FIG. 15 is a plan view (inner side) of an expanded state of filled portions 41U, 42U formed by attaching a part of the outer sheet 121U and a part of the intermediate sheet 122U.

The sheet material container C3 is a container such that decorative portions (outer decorative portion 36k, intermediate decorative portion 36m, and decorative portion 36n) provided on the outer sheet 121U, the intermediate sheet 122U, and the inner sheet 123U are combined to provide an esthetic effect.

Figure 14:
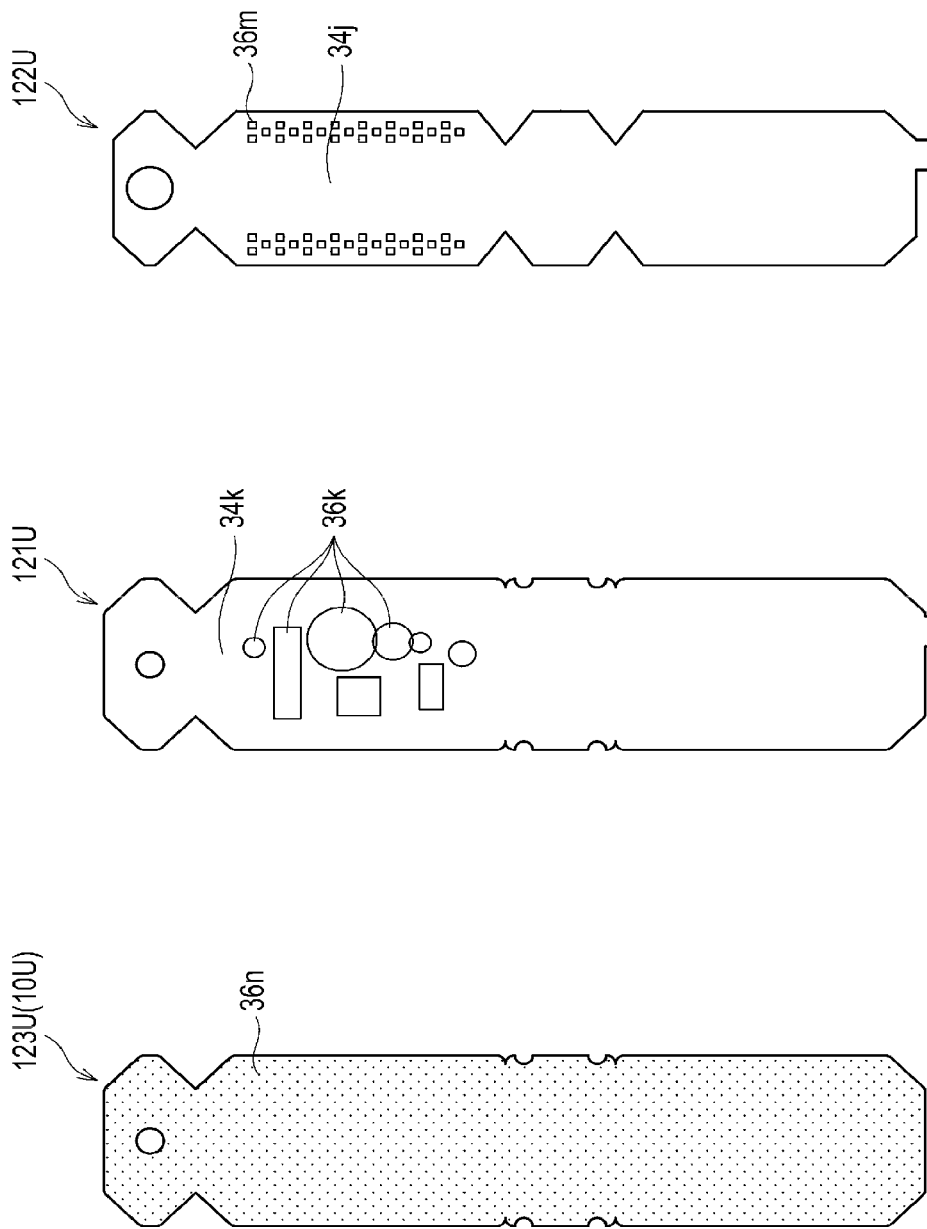
FIG. 14A is a plan view of an expanded state of an inner sheet that forms an inner bag of the sheet material container.
FIG. 14B is a plan view (outer side) of an expanded state of an outer sheet.
FIG. 14C is a plan view (outer side) of an expanded state of an intermediate sheet.
Figure 15:
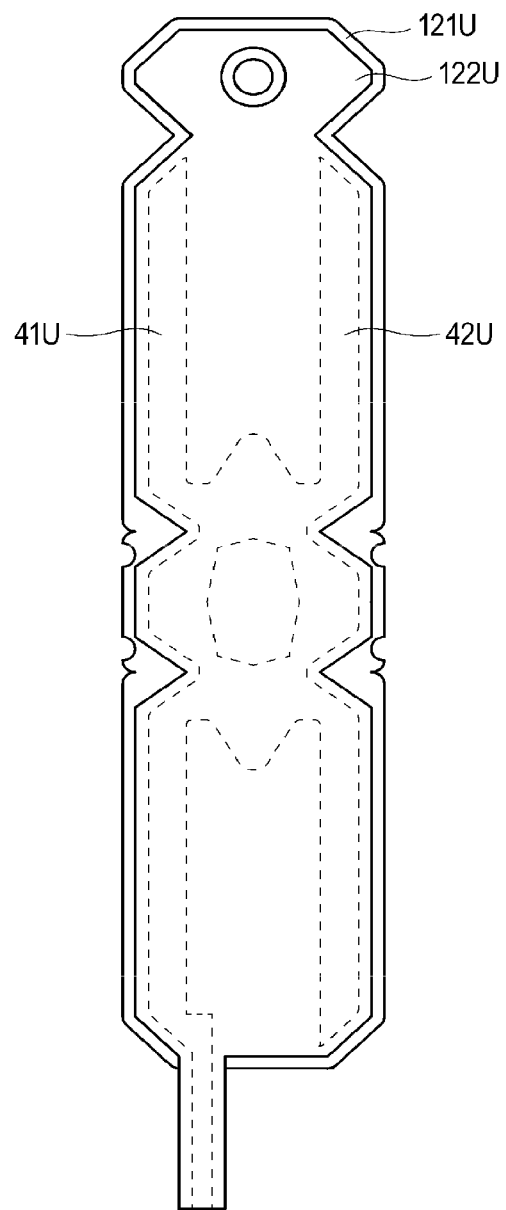
FIG. 15 is a plan view (inner side) of an expanded state of filled portions formed by attaching a part of the outer sheet and a part of the intermediate sheet.

As shown in FIGS. 13 to 15, the sheet material container C3 according to this embodiment is formed of a layer sheet 120U including the inner sheet 123U, the intermediate sheet 122U covering an outer side of the inner sheet 123U, and the outer sheet 121U covering an outer side of the intermediate sheet 122U.

Filled portions 41U, 42U enclosing a filler are partially formed between the outer sheet 121U and the intermediate sheet 122U.

As show in FIGS. 13, 14A, and 14B, in the sheet material container C3 according to this embodiment, the decorative portion 36n with decoration is provided on the inner sheet 123U. The outer decorative portion 36k with decoration is also provided on the outer sheet 121U.

The decorative portion 36n on the inner sheet 123U is located in a position overlapping light transmitting portions 34j, 34k in the intermediate sheet 122U and the outer sheet 121U when seen from outside the sheet material container C3, and in a position where visible light is transmitted through the light transmitting portions 34j, 34k from outside the sheet material container C3.

No member without light transmittance is provided between the decorative portion 36n and the light transmitting portion 34j and between the light transmitting portion 34j and the light transmitting portion 34k. On the other hand, a member including at least an area with light transmittance may be provided between the decorative portion 36n and the light transmitting portions 34j, 34k between the inner sheet 123U and the intermediate sheet 122U or between the intermediate sheet 122U and the outer sheet 121U.

With such a configuration, the visible light can be transmitted through the light transmitting portions 34j, 34k in the intermediate sheet 122U and the outer sheet 121U to the decorative portion 36n on the inner sheet 123U.

In the sheet material container C3 according to this embodiment, the entire inner sheet 123U (inner bag 10U) has a chromatic color. Specifically, the decorative portion 36n decorated with the chromatic color is formed on the entire inner sheet 123U. The present invention is not limited to such a configuration, but the chromatic color may be applied to only an outer surface of the inner sheet 123U, or the chromatic color, an achromatic color, or patterns may be applied to only a part of the inner sheet 123U. The decorative portion may or may not have light transmittance.

According to the above described configuration, the visible light can be transmitted through the light transmitting portions 34k, 34j to the decorative portion 36n provided on the inner sheet 123U. This can provide a decorative effect of the outer decorative portion 36k provided on the outer sheet 121U and also an additional decorative effect of the decorative portion 36n to the sheet material container C.

For a general delamination bottle (not shown) including a plastic container and a release film arranged inside the plastic container, the plastic container and the release film are molded from one parison. The release film and an inner surface of the plastic container form a closed space, and thus it is difficult to decorate a surface of the release film facing the plastic container.

On the other hand, the sheet material container C3 according to this embodiment is formed of the layer sheet 120U, which can be formed by separately forming the inner sheet 123U, the intermediate sheet 122U, and the outer sheet 121U and attaching part of the sheets. Thus, at a stage prior to forming the layer sheet 120U, the decorative portion 36n can be provided on the inner sheet 123U.

In this embodiment, the decorative portion 36n with decoration is provided on the inner sheet 123U, and the intermediate decorative portion 36m with decoration is provided on the intermediate sheet 122U. The decorative portion 36n is located in the position overlapping the light transmitting portions 34j, 34k in the intermediate sheet 122U and the outer sheet 121U when seen from outside the sheet material container C3, and the intermediate decorative portion 36m is located in a position overlapping the light transmitting portion 34k in the outer sheet 121U when seen from outside the sheet material container C3.

As described above, the decorative portion 36n and the intermediate decorative portion 36m are located in positions where the visible light is transmitted through the light transmitting portions 34k, 34j from outside the sheet material container C3.

No member without light transmittance is provided between the intermediate decorative portion 36m and at least a part of the light transmitting portion 34k. On the other hand, a member including at least an area with light transmittance may be provided between the intermediate decorative portion 36m and the light transmitting portion 34k between the intermediate sheet 122U and the outer sheet 121U.

With such a configuration, the visible light can be transmitted through the light transmitting portion 34k in the outer sheet 121U to the intermediate decorative portion 36m on the intermediate sheet 122U.

According to the above described configuration, the visible light can be transmitted through the light transmitting portions 34k, 34j to the decorative portion 36n provided on the inner sheet 123U, and the visible light can be transmitted through the light transmitting portion 34k to the intermediate decorative portion 36m provided on the intermediate sheet 122U. This can provide a decorative effect of the outer decorative portion 36k provided on the outer sheet 121U and also an additional decorative effect of the intermediate decorative portion 36m and the decorative portion 36n to the sheet material container C3.

Also, the intermediate decorative portion 36m with decoration is provided on the intermediate sheet 122U according to this embodiment, the outer decorative portion 36k with decoration is provided on the outer sheet 121U, and the light transmitting portion 34k is provided in the outer sheet 121U. The intermediate decorative portion 36m is located in the position overlapping the light transmitting portion 34k in the outer sheet 121U when seen from outside the sheet material container C3, and in a position where the visible light is transmitted through the light transmitting portion 34k from outside the sheet material container C3.

According to the above described configuration, the visible light can be transmitted through the light transmitting portion 34k to the intermediate decorative portion 36m provided on the intermediate sheet 122U. This can provide a decorative effect of the outer decorative portion 36k provided on the outer sheet 121U and also an additional decorative effect of the intermediate decorative portion 36m to the sheet material container C3.

Also, in the sheet material container C3 according to this embodiment, the decorative portion 36n with decoration is provided on the inner sheet 123U, the intermediate decorative portion 36m with decoration is provided on the intermediate sheet 122U, and the outer decorative portion 36k with decoration is provided on the outer sheet 121U.

The decorative portion 36n is located in the position overlapping the light transmitting portions 34j, 34k in the intermediate sheet 122U and the outer sheet 121U when seen from outside the sheet material container C3.

The intermediate decorative portion 36m is located in the position overlapping the light transmitting portion 34k in the outer sheet 121U when seen from outside the sheet material container C3.

The decorative portion 36n, the intermediate decorative portion 36m, and the outer decorative portion 36k are located in positions where the visible light is transmitted through the light transmitting portions 34k, 34j or the light transmitting portion 34j from outside the sheet material container C3, or in positions where the visible light is directly applied.

According to the above described configuration, the visible light can be transmitted through the light transmitting portions 34k, 34j to the decorative portion 36n, and the visible light can be transmitted through the light transmitting portion 34k to the intermediate decorative portion 36m. This can provide a decorative effect of the outer decorative portion 36k and also an additional decorative effect of the intermediate decorative portion 36m and the decorative portion 36n to the sheet material container C3.

At least parts of the intermediate decorative portion 36m and the outer decorative portion 36k have light transmittance, and overlap at least a part of the decorative portion 36n provided on the inner sheet 123U when seen from outside the sheet material container C3. The decorative portion 36n, the intermediate decorative portion 36m, and the outer decorative portion 36k in an overlapping state are located in a position where the visible light is transmitted from outside the sheet material container C3.

According to the above described configuration, any two or more of the decorative portion 36n, the intermediate decorative portion 36m, and the outer decorative portion 36k in the overlapping state can be visually recognized from outside the sheet material container C3, thereby providing a high design effect.

Fifth Embodiment

Next, with reference to FIGS. 16 to 19, a sheet material container C4 (sheet material container filled with contents CA4) according to a fifth embodiment will be described.

Figure 16:
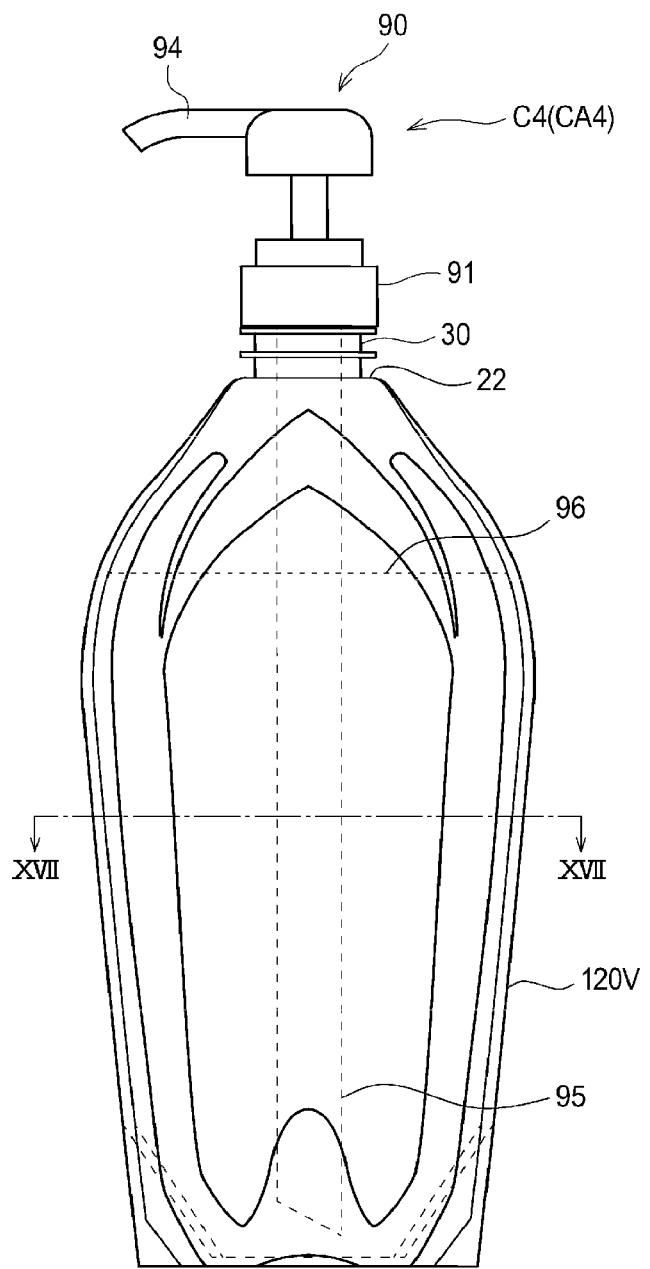
FIG. 16 is a front view of a sheet material container filled with contents according to a fifth embodiment.
Figure 17:
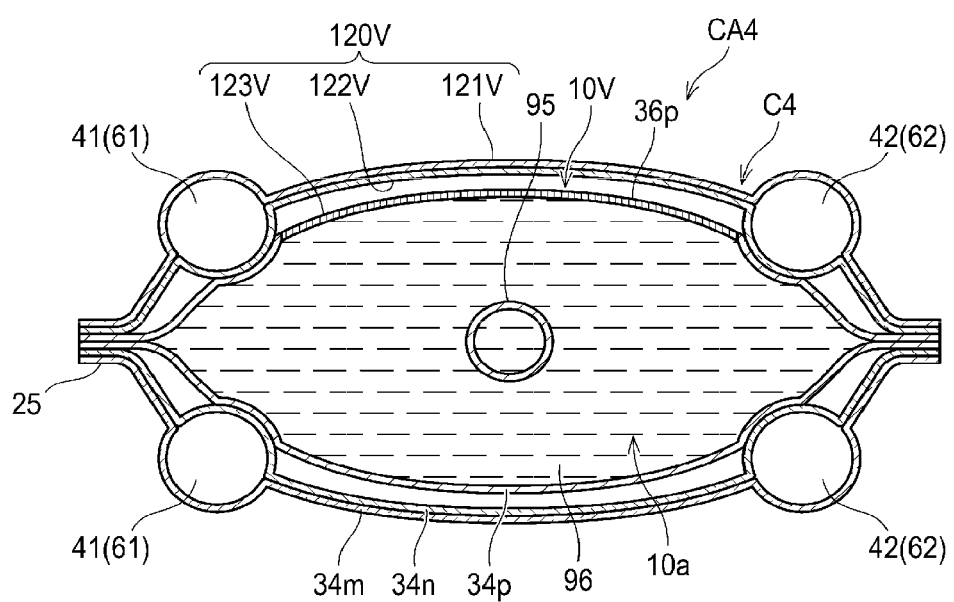
FIG. 17 is a sectional view of the sheet material container filled with contents taken along a line XVII-XVII in FIG. 16.
Figure 18:
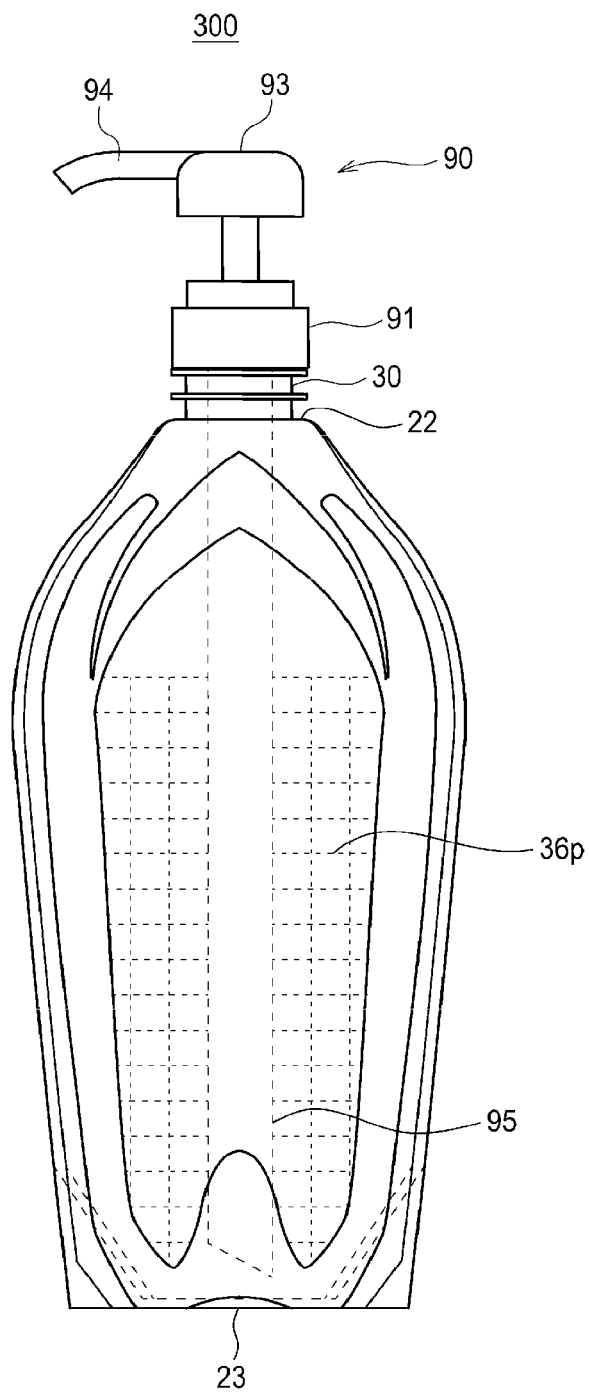
FIG. 18 is a front view of the sheet material container with a decorative portion being exposed.
Figure 19:
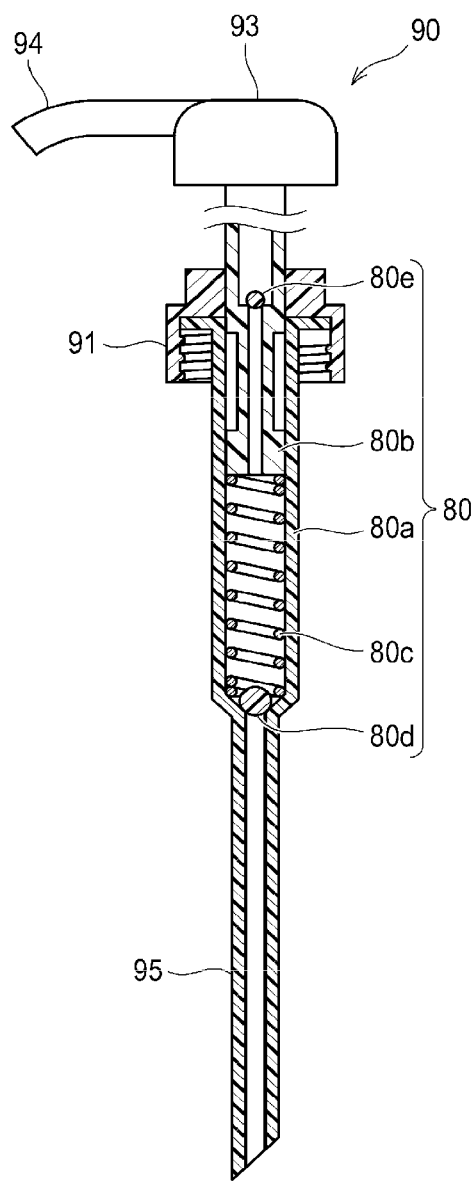
FIG. 19 is a schematic partial sectional view of a cap with pump including a check valve.

FIG. 16 is a front view of the sheet material container filled with contents CA4 (sheet material container C4) according to the fifth embodiment, FIG. 17 is a sectional view of the sheet material container filled with contents CA4 taken along a line XVII-XVII in FIG. 16, FIG. 18 is a front view of the sheet material container C4 with a decorative portion 36p being exposed, and FIG. 19 is a schematic partial sectional view of a cap with pump 90 including a check valve.

The sheet material container C4 (sheet material container filled with contents CA4) is a container having a function of exposing the decorative portion 36p to the outside of the sheet material container C4 when contents 96 in a containing portion 10a decreases.

As shown in FIGS. 16 to 19, the sheet material container C4 according to this embodiment is formed of a layer sheet 120V including an inner sheet 123V, an intermediate sheet 122V covering an outer side of the inner sheet 123V, and an outer sheet 121V covering an outer side of the intermediate sheet 122V. Filled portions 41, 42 enclosing a filler are partially formed between the outer sheet 121V and the intermediate sheet 122V. The sheet material container C4 further includes the cap with pump 90 that allows the contents 96 to be discharged from the containing portion 10a to the outside.

In the sheet material container filled with contents CA4 (sheet material container C4), the decorative portion 36p with decoration is provided on at least any of the inner sheet 123V, the intermediate sheet 122V, and the outer sheet 121V (in this embodiment, an example of the decorative portion 36p provided on the inner sheet 123V is shown). The decorative portions 36p may be provided on two or more of the sheets.

Specifically, the decorative portion 36p is provided on at least one side (back side in this embodiment) of opposite sides of the sheet material container C4 with the containing portion 10a between the opposite sides.

At least parts of peripheral edges of the inner sheet 123V are attached so that the inner sheet 123V forms an inner bag 10V. The decorative portion 36p according to this embodiment is provided on an inner surface of the back side of the inner bag 10V.

The inner sheet 123V includes a light transmitting portion 34p, the intermediate sheet 122V includes a light transmitting portion 34n, and the outer sheet 121V includes a light transmitting portion 34m.

Specifically, the light transmitting portions 34m, 34n, 34p are provided in areas overlapping the decorative portion 36p from a side (front side in this embodiment) opposite the one side of the sheet material container C4 in all of the outer sheet 121V, the intermediate sheet 122V, and the inner sheet 123V.

No member without light transmittance is provided between the light transmitting portions 34m, 34n, 34p except the contents 96. On the other hand, a member including at least an area with light transmittance may be provided between the decorative portion 36p and the light transmitting portions 34m, 34n, 34p between the inner sheet 123V and the intermediate sheet 122V or between the intermediate sheet 122V and the outer sheet 121V.

With such a configuration, if no contents 96 are held and if contents 96 with light transmittance are held, visible light can be transmitted through the light transmitting portions 34m, 34n, 34p to the decorative portion 36p from the front side of the sheet material container filled with contents CA4.

According to the above described configuration, if contents 96 without light transmittance or having the same or similar color as the decorative portion 36p is held in the containing portion 10a, as shown in FIG. 16, it is possible that the decorative portion 36p is not exposed to the outside of the sheet material container filled with contents CA4. On the other hand, when the contents 96 in the containing portion 10a decreases and the containing portion 10a (inner bag 10V) contracts in a depth direction, or the contents 96 in the containing portion 10a is used up as shown in FIG. 18, the decorative portion 36p can be exposed. Specifically, a user can visually recognize the decorative portion 36p and check a degree of decrease of the contents 96.

In this embodiment, the configuration in which the decorative portion 36p is provided only on the back side (one side) of the sheet material container C4 has been described, but a decorative portion may be also provided on the front side (side opposite the one side) of the sheet material container C4. Specifically, the decorative portions may be provided on the opposite sides of the sheet material container C4 with the containing portion 10a between the opposite sides.

With such a configuration, when the contents 96 in the containing portion 10a decreases and the containing portion 10a (inner bag 10V) contracts in the depth direction or a liquid level decreases, the decorative portion 36p on the back side can be exposed to overlap the decorative portion on the front side. This can provide an additional decorative effect to the sheet material container C4.

A part of the inner sheet 123V according to this embodiment can be separated from the intermediate sheet 122V, and a volume of the inner bag 10V can increase or decrease according to an amount of the contents 96 held. A check valve 80 is mounted to the inner bag 10V. The check valve 80 is mounted in such a direction as to allow the contents 96 to be discharged from the inner bag 10V and prevent air from flowing backward into the inner bag 10V.

In this embodiment, as shown in FIG. 19, the check valve 80 is provided in the cap with pump 90 including a pressing portion 93 and a liquid feed tube 95. A cap portion 91 of the cap with pump 90 is mounted to a spout 30, and the cap with pump 90 is mounted to the inner bag 10V, and thus the check valve 80 is indirectly mounted to the inner bag 10V.

Specifically, the check valve 80 according to this embodiment includes a cylinder portion 80a, a piston portion 80b that can reciprocate in the cylinder portion 80a, a spring 80c that presses the piston portion 80b back to a protruding position, a spherical intake valve 80d provided in a lower part, and a spherical discharge valve 80e provided in an upper part.

If the user presses down the pressing portion 93, the piston portion 80b connected to the pressing portion 93 moves down against urging of the spring 80c. At this time, pressure in a space below the piston portion 80b increases to instantaneously raise the discharge valve 80e from the piston portion 80b.

If the user stops pressing the pressing portion 93, urging of the spring 80c moves the piston portion 80b upward. At this time, the pressure in a space below the piston portion 80b decreases to instantaneously raise the intake valve 80d.

The intake valve 80d is raised to create a gap, through which the contents 96 are sucked through the liquid feed tube 95 into the cylinder portion 80a decreased in pressure. Then, the intake valve 80d moves down by its own weight, thereby preventing air from moving down into the inner bag 10V.

If the user further presses down the pressing portion 93 to increase the pressure in the space below the piston portion 80b, the discharge valve 80e is raised from the piston portion 80b to create a gap, through which the contents 96 are supplied to a nozzle portion 94, and the contents 96 are discharged from the nozzle portion 94.

With the check valve 80 being thus mounted to the inner bag 10V, an internal volume of the inner bag 10V increases or decreases according to an amount of the contents 96. In this case, unless the outer sheet 121V or the intermediate sheet 122V has light transmittance, it is difficult to check the amount of the contents 96 in the inner bag 10V.

On the other hand, in the sheet material container C4 according to this embodiment, the light transmitting portions 34m, 34n, 34p are provided on the front side of the sheet material container C4 in all of the inner sheet 123V, the intermediate sheet 122V, and the outer sheet 121V. Thus, the user can check an outer shape of the inner bag 10V which changes according to the amount of the contents 96 therein, and check the amount of the contents 96 therein through the light transmitting portions 34m, 34n, 34p.

Further, in the sheet material container C4 according to this embodiment, as described above, when the contents 96 in the containing portion 10a decrease, the decorative portion 36p can be exposed. Specifically, the user can visually recognize the decorative portion 36p and thus check a degree of decrease of the contents 96.

The "check valve" according to the present invention is not limited to the check valve 80 with the above descried configuration as long as it can prevent air from flowing into the inner bag 10V. For example, a check valve such as a duckbill valve or of other structures which can be directly mounted to the inner bag 10V may be applied and provided in the spout 30.

The outer sheets 121, 121S, 121T, 121U, 121V, the intermediate sheets 122, 122S, 122T, 122U, 122V, and the inner sheets 123, 123S, 123T, 123U, 123V that form the sheet material container according to the above described embodiments may be synthetic resin films, and for example, resin such as polyester resin, polyamide resin, or polypropylene resin may be used. However, the sheets are not limited to them as long as they form a container that contains contents.

The outer sheets 121, 121S, 121T, 121U, 121V, the intermediate sheets 122, 122S, 122T, 122U, 122V, and the inner sheets 123, 123S, 123T, 123U, 123V according to the above described embodiments may include further laminated layers. For example, the layers may be polyethylene terephthalate (PET) or stretched nylon (ONy) layers, transparent deposited PET layers formed of polyethylene terephthalate deposited with silica or alumina, stretched nylon layers, or linear low-density polyethylene (LLDPE), or combinations thereof.

The decorative portion provided on each sheet may be provided on a part of the laminated layers. The sheet material container may include other sheets in addition to the above described sheets.

The above described embodiments encompass the following technical ideas.

<1> A sheet material container comprising a containing portion that contains contents and formed of a layer sheet, wherein the layer sheet includes an inner sheet, an intermediate sheet covering an outer side of the inner sheet, and an outer sheet covering an outer side of the intermediate sheet, and is arranged on opposite sides with the containing portion between the opposite sides, at least parts of peripheral edges of the inner sheet are attached so that the inner sheet forms an inner bag, the outer sheet and the intermediate sheet have attached portions partially attached to each other and non-attached regions not attached to each other, a filled portion enclosing a filler is formed between the outer sheet and the intermediate sheet in the non-attached region, at least parts of the outer sheet and the intermediate sheet include light transmitting portions that can transmit visible light, the light transmitting portions in the outer sheet and the intermediate sheet have portions overlapping each other when seen from outside the sheet material container, and the inner sheet or the contents can be visually recognized through the light transmitting portions from outside the sheet material container.

<2> The sheet material container according to <1>, wherein a part of the inner sheet can be separated from the intermediate sheet.

<3> The sheet material container according to <1>, wherein a part of the inner sheet can be separated from the intermediate sheet, and a volume of the inner bag can increase or decrease according to an amount of the contents held.

<4> The sheet material container according to any one of <1> to <3>, wherein the light transmitting portion is an opening provided in the outer sheet and the intermediate sheet.

<5> The sheet material container according to <4>, wherein the opening is a gap between peripheral edges of the outer sheet and the intermediate sheet folded to face each other.

<6> The sheet material container according to any one of <1> to <5>, wherein the light transmitting portions of both the outer sheet and the intermediate sheet are arranged in positions where visible light from outside the sheet material container can be linearly transmitted to at least a part of the inner sheet.

<7> The sheet material container according to any one of <1> to <3>, wherein the light transmitting portion is provided in the non-attached region forming the filled portion in each of the outer sheet and the intermediate sheet, a decorative portion with decoration is provided in at least a part of the inner sheet, the decorative portion is formed in a position overlapping the light transmitting portion when seen from outside the sheet material container, and in a position where visible light is transmitted through the light transmitting portion from outside the sheet material container.

<8> The sheet material container according to any one of <1> to <3>, wherein the light transmitting portion is provided in the non-attached region forming the filled portion in the outer sheet, an intermediate decorative portion with decoration is provided in at least a part of the intermediate sheet, the intermediate decorative portion is formed in a position overlapping the light transmitting portion provided in the outer sheet when seen from outside the sheet material container, and in a position where visible light is transmitted through the light transmitting portion from outside the sheet material container.

<9> The sheet material container according to <8>, wherein an outer decorative portion with decoration is provided in the non-attached region forming the filled portion in the outer sheet.

<10> The sheet material container according to <9>, wherein the filled portion has an uneven shape, and the outer decorative portion includes an area with the uneven shape.

<11> The sheet material container according to any one of <1> to <6>, wherein the filled portion is arranged on at least one of opposite side sections of the sheet material container, a decorative portion with decoration is provided on at least a part of the inner sheet, and the decorative portion has a three-dimensional shape on the inner sheet between the opposite side sections.

<12> The sheet material container according to <11>, wherein the filled portion is provided on each of the opposite side sections of the sheet material container.

<13> The sheet material container according to <11> or <12>, further comprising a take-out portion that is connected to the inner bag and can discharge the contents to the outside, the intermediate sheet and the outer sheet are provided over the take-out portion and a bottom of the sheet material container, and the filled portion is provided to stand from the bottom on the opposite side sections in a direction perpendicular to a direction connecting the take-out portion and the bottom.

<14> The sheet material container according to any one of <11> to <13>, wherein the inner sheet includes facing surfaces located on the opposite side sections of the sheet material container and facing the filled portion between the containing portion and the filled portion, and crossing surfaces located between the facing surfaces on the opposite side sections of the sheet material container and crossing the facing surfaces, and the decorative portions are provided on at least the facing surfaces.

<15> The sheet material container according to <14>, wherein the decorative portions are provided on the facing surfaces and the crossing surfaces and have a polyhedral shape.

<16> The sheet material container according to <15>, wherein the decorative portions include areas continuously provided on the facing surfaces and the crossing surfaces.

<17> The sheet material container according to any one of <11> to <16>, wherein the opposite side sections of the inner sheet are held between the intermediate sheets arranged on the opposite sides with the containing portion between the opposite sides, the inner sheet includes held portions on the opposite side sections, and a middle portion in a middle section that is not held between the intermediate sheets, and the decorative portion is provided on the middle portion.

<18> The sheet material container according to any one of <1> to <6>, wherein a decorative portion with decoration is provided on the inner sheet, and the decorative portion on the inner sheet is located in a position overlapping the light transmitting portions in the intermediate sheet and the outer sheet when seen from outside the sheet material container, and in a position where visible light is transmitted through the light transmitting portions from outside the sheet material container.

<19> The sheet material container according to any one of <1> to <6>, wherein a decorative portion with decoration is provided on the inner sheet, an outer decorative portion with decoration is provided on the outer sheet, and the decorative portion is located in a position overlapping the light transmitting portions in the intermediate sheet and the outer sheet when seen from outside the sheet material container, and in a position where visible light is transmitted through the light transmitting portions from outside the sheet material container.

<20> The sheet material container according to any one of <1> to <6>, wherein a decorative portion with decoration is provided on the inner sheet, an intermediate decorative portion with decoration is provided on the intermediate sheet, the decorative portion is located in a position overlapping the light transmitting portions in the intermediate sheet and the outer sheet when seen from outside the sheet material container, the intermediate decorative portion is located in a position overlapping the light transmitting portion in the outer sheet when seen from outside the sheet material container, and the decorative portion and the intermediate decorative portion are located in positions where visible light is transmitted through the light transmitting portions from outside the sheet material container.

<21> The sheet material container according to any one of <1> to <6>, wherein an intermediate decorative portion with decoration is provided on the intermediate sheet, an outer decorative portion with decoration is provided on the outer sheet, and the intermediate decorative portion is located in a position overlapping the light transmitting portion in the outer sheet when seen from outside the sheet material container, and in a position where visible light is transmitted through the light transmitting portion from outside the sheet material container.

<22> The sheet material container according to any one of <1> to <6>, wherein a decorative portion with decoration is provided on the inner sheet, an intermediate decorative portion with decoration is provided on the intermediate sheet, an outer decorative portion with decoration is provided on the outer sheet, the decorative portion is located in positions overlapping the light transmitting portions in the intermediate sheet and the outer sheet when seen from outside the sheet material container, the intermediate decorative portion is located in a position overlapping the light transmitting portion in the outer sheet when seen from outside the sheet material container, and the decorative portion, the intermediate decorative portion, and the outer decorative portion are located in positions where visible light is transmitted through the light transmitting portions from outside the sheet material container.

<23> The sheet material container according to <22>, wherein the decorative portion, the intermediate decorative portion, and the outer decorative portion provide different decorative expressions according to a positional relationship among the inner sheet, the intermediate sheet, and the outer sheet.

<24> The sheet material container according to <22> or <23>, wherein at least a part of the intermediate decorative portion and the outer decorative portion have light transmittance, and overlaps at least a part of the decorative portion provided on the inner sheet when seen from outside the sheet material container, and the decorative portion, the intermediate decorative portion, and the outer decorative portion in an overlapping state are located in a position where visible light is transmitted from outside the sheet material container.

<25> The sheet material container according to any one of <1> to <6>, wherein a decorative portion with decoration is provided on at least any of the inner sheet, the intermediate sheet, and the outer sheet, the decorative portion is provided on at least one side of the opposite sides of the sheet material container with the containing portion between the opposite sides, and the light transmitting portions are provided in areas overlapping the decorative portion from a side opposite the one side of the sheet material container in all of the inner sheet, the intermediate sheet, and the outer sheet.

<26> The sheet material container according to <25>, wherein the decorative portions are provided on the opposite sides of the sheet material container with the containing portion between the opposite sides.

<27> The sheet material container according to <25> or <26>, wherein a part of the inner sheet can be separated from the intermediate sheet, a volume of the inner bag can increase or decrease according to an amount of the contents held, a check valve is mounted to the inner bag, the check valve is mounted in such a direction as to allow the contents to be discharged from the inner bag and prevent air from flowing backward into the inner bag.

<28> A sheet material container filled with contents, comprising:

the sheet material container according to any one of <1> to <27>; and the contents held in the containing portion.

<29> The sheet material container filled with contents according to <28>, wherein a decorative portion with decoration is provided on at least any of the inner sheet, the intermediate sheet, and the outer sheet, the decorative portion is formed in a position overlapping the light transmitting portion when seen from outside the sheet material container, and in a position where visible light is transmitted through the light transmitting portion from outside the sheet material container, and the contents have a same or similar color as the decorative portion.

REFERENCE SIGNS LIST

10, 10S, 10T, 10U, 10V inner bag
10a, 10Ta containing portion
10Tb surface along depth (facing surface)
10Tc front surface (crossing surface)
10Td back surface (crossing surface)
10Te side end (held portion)
14 opening
22 ceiling
23T bottom
24, 24a opening 25 attached portion
26 opening
30 spout
34a, 34b, 34c, 34d, 34e, 34f, 349, 34h, 34i, 34j, 34k, 34m, 34n, 34p light transmitting portion
36a, 36h, 36i, 36j, 36n, 36p decorative portion
36b, 36c, 36d, 36m intermediate decorative portion (decorative portion)
36e, 36f, 36g, 36k outer decorative portion (decorative portion)
41, 41S, 41T filled portion
42, 42S, 42T filled portion
44S filled portion
61S non-attached region
62, 62S non-attached region
64S non-attached region
80 check valve
80a cylinder portion
80b piston portion
80c spring
80d intake valve
80e discharge valve
90 cap with pump (take-out portion)
91 cap portion
93 pressing portion
94 nozzle portion
95 liquid feed tube
96 contents
120, 120S, 120T, 120U, 120V layer sheet
121, 121S, 121T, 121U, 121V outer sheet
122, 122S, 122T, 122U, 122V intermediate sheet
123, 123S, 123T, 123U, 123V inner sheet
C, C1, C2, C3, C4 sheet material container
CA, CA1, CA2, CA4 sheet material container filled with contents

The invention claimed is:

1. A sheet material container comprising a layer sheet and having a containing portion configured to contain a content therein,
wherein the layer sheet includes an inner sheet, an intermediate sheet covering an outer side of the inner sheet, and an outer sheet covering an outer side of the intermediate sheet, and is arranged on opposite sides with respect to the containing portion,
at least parts of peripheral edges of the inner sheet are attached so that the inner sheet forms an inner bag,
the outer sheet and the intermediate sheet have attached portions partially attached to each other and non-attached regions not attached to each other,
a filled portion enclosing a filler is formed between the outer sheet and the intermediate sheet in the non-attached region,
at least parts of the outer sheet and the intermediate sheet include light transmitting portions that can transmit visible light,
the light transmitting portions in the outer sheet and the intermediate sheet have portions overlapping each other when seen from outside the sheet material container, and
the inner sheet or the content is visible through the light transmitting portions from outside the sheet material container.

2. The sheet material container according to claim 1, wherein a part of the inner sheet is separable from the intermediate sheet.

3. The sheet material container according to claim 1,
wherein a part of the inner sheet is separable from the intermediate sheet, and
a volume of the inner bag increases or decreases according to an amount of the content held.

4. The sheet material container according to claim 1, wherein the light transmitting portion is an opening provided in the outer sheet and the intermediate sheet.

5. The sheet material container according to claim 4, wherein the opening is a gap between peripheral edges of the outer sheet and the intermediate sheet folded to face each other.

6. The sheet material container according to claim 1,
wherein the light transmitting portion is provided in the non-attached region forming the filled portion in each of the outer sheet and the intermediate sheet,
a decorative portion with decoration is provided in at least a part of the inner sheet, and
the decorative portion is formed in a position overlapping the light transmitting portion when seen from outside the sheet material container, and in a position where visible light is transmitted through the light transmitting portion from outside the sheet material container.

7. The sheet material container according to claim 1,
wherein the light transmitting portion is provided in the non-attached region forming the filled portion in the outer sheet,
an intermediate decorative portion with decoration is provided in at least a part of the intermediate sheet, and
the intermediate decorative portion is formed in a position overlapping the light transmitting portion provided in the outer sheet when seen from outside the sheet material container, and in a position where visible light is transmitted through the light transmitting portion from outside the sheet material container.

8. The sheet material container according to claim 7, wherein an outer decorative portion with decoration is provided in the non-attached region forming the filled portion in the outer sheet.

9. The sheet material container according to claim 8,
wherein the filled portion has an uneven shape, and
the outer decorative portion includes an area with the uneven shape.

10. The sheet material container according to claim 1,
wherein the filled portion is arranged on at least one of opposite side sections of the sheet material container,
a decorative portion with decoration is provided on at least a part of the inner sheet, and
the decorative portion has a three-dimensional shape on the inner sheet between the opposite side sections.

11. The sheet material container according to claim 1,
wherein a decorative portion with decoration is provided on the inner sheet, and
the decorative portion on the inner sheet is located in a position overlapping the light transmitting portions in the intermediate sheet and the outer sheet when seen from outside the sheet material container, and in a position where visible light is transmitted through the light transmitting portions from outside the sheet material container.

12. The sheet material container according to claim 1,
wherein a decorative portion with decoration is provided on the inner sheet,
an outer decorative portion with decoration is provided on the outer sheet, and
the decorative portion is located in a position overlapping the light transmitting portions in the intermediate sheet and the outer sheet when seen from outside the sheet material container, and in a position where visible light is transmitted through the light transmitting portions from outside the sheet material container.

13. The sheet material container according to claim 1, wherein a decorative portion with decoration is provided on the inner sheet, an intermediate decorative portion with decoration is provided on the intermediate sheet, the decorative portion is located in a position overlapping the light transmitting portions in the intermediate sheet and the outer sheet when seen from outside the sheet material container, the intermediate decorative portion is located in a position overlapping the light transmitting portion in the outer sheet when seen from outside the sheet material container, and the decorative portion and the intermediate decorative portion are located in positions where visible light is transmitted through the light transmitting portions from outside the sheet material container.

14. The sheet material container according to claim 1, wherein an intermediate decorative portion with decoration is provided on the intermediate sheet, an outer decorative portion with decoration is provided on the outer sheet, and the intermediate decorative portion is located in a position overlapping the light transmitting portion in the outer sheet when seen from outside the sheet material container, and in a position where visible light is transmitted through the light transmitting portion from outside the sheet material container.

15. The sheet material container according to claim 1, wherein a decorative portion with decoration is provided on the inner sheet, an intermediate decorative portion with decoration is provided on the intermediate sheet, an outer decorative portion with decoration is provided on the outer sheet, the decorative portion is located in positions overlapping the light transmitting portions in the intermediate sheet and the outer sheet when seen from outside the sheet material container, the intermediate decorative portion is located in a position overlapping the light transmitting portion in the outer sheet when seen from outside the sheet material container, and the decorative portion, the intermediate decorative portion, and the outer decorative portion are located in positions where visible light is transmitted through the light transmitting portions from outside the sheet material container.

16. The sheet material container according to claim 15, wherein the decorative portion, the intermediate decorative portion, and the outer decorative portion provide different decorative expressions according to a positional relationship among the inner sheet, the intermediate sheet, and the outer sheet.

17. The sheet material container according to claim 15, wherein at least a part of the intermediate decorative portion and the outer decorative portion have light transmittance, and overlaps at least a part of the decorative portion provided on the inner sheet when seen from outside the sheet material container, and the decorative portion, the intermediate decorative portion, and the outer decorative portion in an overlapping state are located in a position where visible light is transmitted from outside the sheet material container.

18. The sheet material container according to claim 1, wherein a decorative portion with decoration is provided on at least any of the inner sheet, the intermediate sheet, and the outer sheet, the decorative portion is provided on at least one side of the opposite sides of the sheet material container with the containing portion between the opposite sides, and the light transmitting portions are provided in areas overlapping the decorative portion from a side opposite the one side of the sheet material container in all of the inner sheet, the intermediate sheet, and the outer sheet.

19. The sheet material container according to claim 18, wherein the decorative portions are provided on the opposite sides of the sheet material container with the containing portion between the opposite sides.

20. A sheet material container filled with contents, comprising:

the sheet material container according to claim 1; and the contents held in the containing portion.

* * * * *